(12) United States Patent
Eto

(10) Patent No.: US 10,915,999 B2
(45) Date of Patent: Feb. 9, 2021

(54) IMAGE PROCESSING APPARATUS, IMAGE PROCESSING METHOD, AND PROGRAM

(71) Applicant: SONY CORPORATION, Tokyo (JP)

(72) Inventor: Hiroaki Eto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 165 days.

(21) Appl. No.: 16/098,726

(22) PCT Filed: May 1, 2017

(86) PCT No.: PCT/JP2017/017115
§ 371 (c)(1),
(2) Date: Nov. 2, 2018

(87) PCT Pub. No.: WO2017/203942
PCT Pub. Date: Nov. 30, 2017

(65) Prior Publication Data
US 2019/0139201 A1   May 9, 2019

(30) Foreign Application Priority Data
May 25, 2016 (JP) .................................. 2016-104440

(51) Int. Cl.
G06K 9/00 (2006.01)
G06T 5/00 (2006.01)
(Continued)

(52) U.S. Cl.
CPC ............. *G06T 5/007* (2013.01); *G06T 5/00* (2013.01); *G09G 5/00* (2013.01); *G09G 5/02* (2013.01);
(Continued)

(58) Field of Classification Search
CPC . G06T 5/007; G06T 5/00; G09G 5/00; G09G 5/02; G09G 5/391; H04N 1/3871;
(Continued)

(56) References Cited

U.S. PATENT DOCUMENTS 10,019,814 B2 * 7/2018 Kolesnikov .......... H04N 19/154
10,554,981 B2 * 2/2020 Ramasubramonian .......................
                                                  H04N 19/167
(Continued)

FOREIGN PATENT DOCUMENTS

| JP | 2014-502480 A | 1/2014 |
| JP | 2014-531821 A | 11/2014 |
| JP | WO2015/190044 A1 | 12/2015 |

OTHER PUBLICATIONS

Schulte et al., HDR Demystified Emerging UHDTV Systems, Mar. 2016, pp. 1-22, Version 1.0, Portrait Displays. Inc.

*Primary Examiner* — Jonathan S Lee
(74) *Attorney, Agent, or Firm* — Paratus Law Group, PLLC

(57) ABSTRACT

Provided are an apparatus and a method for generating a high quality SDR image without significant reduction in image average luminance by matrix conversion for an HDR image. An image signal processing unit that converts the HDR image into the SDR image converts a pixel value of the HDR image into a pixel value of the SDR image, applying one conversion matrix to low luminance region pixels having luminance that is a prescribed threshold or less among constituent pixels of the HDR image. A high luminance region pixel having higher luminance than the prescribed threshold is set as a highest output pixel of the SDR image after conversion. The conversion matrix to be applied is a matrix having setting in which a change rate of a memory color set in a Macbeth color chart becomes smaller.

20 Claims, 22 Drawing Sheets

(51) Int. Cl.
  *G09G 5/02* (2006.01)
  *G09G 5/391* (2006.01)
  *H04N 1/407* (2006.01)
  *H04N 5/20* (2006.01)
  *H04N 7/01* (2006.01)
  *H04N 5/202* (2006.01)
  *H04N 1/387* (2006.01)
  *G09G 5/00* (2006.01)

(52) U.S. Cl.
  CPC ............ *G09G 5/391* (2013.01); *H04N 1/3871* (2013.01); *H04N 1/407* (2013.01); *H04N 5/20* (2013.01); *H04N 5/202* (2013.01); *H04N 7/01* (2013.01)

(58) Field of Classification Search
  CPC .......... H04N 1/407; H04N 5/20; H04N 5/202; H04N 7/01
  USPC ....................................................... 382/166
  See application file for complete search history.

(56) References Cited

U.S. PATENT DOCUMENTS

| | | | |
|---|---|---|---|
| 10,755,392 B2 * | 8/2020 | Chen | G06T 5/40 |
| 2017/0026627 A1 * | 1/2017 | Toma | H04N 5/2355 |
| 2017/0330312 A1 * | 11/2017 | Nam | G06T 5/009 |
| 2018/0278808 A1 * | 9/2018 | Hsu | G06T 5/007 |
| 2019/0045137 A1 * | 2/2019 | Kamiya | H04N 5/2351 |
| 2019/0253687 A1 * | 8/2019 | Fukushima | H04N 5/23293 |

* cited by examiner

FIG. 5

| (A) IMAGE TYPE | (B) EXAMPLE OF CONVERSION FUNCTION TO BE APPLIED TO SIGNAL CONVERSION PROCESSING | (C) ITU-R CORRESPONDING STANDARD |
|---|---|---|
| (1) HDR1 | SMPTE ST2084 | APPLICATION 1 (Application1) |
| (2) HDR2 | HYBRID LOG-GAMMA (HLG:Hybrid Log-Gamma) | APPLICATION 2 (Application2) |
| (3) SDR | GAMMA 2.2 (Gamma2. 2) | |

IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2017/017115 (filed on May 1, 2017) under 35 U.S.C. § 371, which claims priority to Japanese Patent Application No. 2016-104440 (filed on May 25, 2016), which are all hereby incorporated by reference in their entirety.

TECHNICAL FIELD

The present disclosure relates to an image processing apparatus, an image processing method, and a program. More specifically, the present disclosure relates to an image processing apparatus, an image processing method, and a program for making a high dynamic range (HDR) image displayable on a standard dynamic range (SDR) display device that is a normal dynamic range image display device widely used at present without greatly deteriorating the image quality.

BACKGROUND ART

Recently, the dynamic range of images has been increased due to an increase in the number of bits of imaging devices (image sensors), for example.

The dynamic range of images can be generally expressed by a ratio of minimum luminance to maximum luminance.

In a high dynamic range (HDR) image known as a high image quality image, the contrast ratio between maximum lightness color and lowest lightness color reaches, for example, 10000:1 or more, and the real world can be realistically expressed.

The HDR image can record almost all the luminance in a visible range and can support a dynamic range and color gamut equivalent to human visual characteristics. The HDR image can be said to be an extremely higher quality image than conventional images in terms of realistic expression of shadows, expression of glare, and the like.

On the one hand, a content creation side actively captures and produces the HDR images, on the other hand, many of display devices such as televisions at home to view content are not display devices capable of displaying the HDR images under existing circumstances.

Many of the display devices such as televisions at home are standard dynamic range (SDR) display devices having a narrower dynamic range of displayable images than that of the HDR images. As it now stands, few users use HDR-compatible display devices with maximum luminance of 500 nit or 1000 nit.

When an HDR image is input and displayed on the SDR display device, luminance information and color information inherent to the HDR image are lost, and an image with degraded image quality is displayed. Note that, in the case of outputting an HDR image as an SDR image, processing of adapting the dynamic range of original content to the SDR display device (display) as an image output destination (the processing is also called display mapping) may be performed (for example, see Patent Document 1).

However, not all of display devices have the display mapping function. Further, there is a concern that, when dynamic range conversion is simply performed by linear scaling, a large amount of information is lost and the HDR image becomes an image with visual appearance that is greatly different before and after the conversion. Such a loss of information is contrary to the intention of the producer and supplier of the content.

CITATION LIST

Patent Document

Patent Document 1: Japanese PCT National Publication No. 2014-502480

SUMMARY OF THE INVENTION

Problems to be Solved by the Invention

The present disclosure has been made in view of the foregoing, and an objective of the present disclosure is to provide an image processing apparatus, an image processing method, and a program that realize high quality image display without significantly degrading the image quality in a case of displaying an HDR image on an SDR display device, for example.

Solutions to Problems

A first aspect of the present disclosure is in an image processing apparatus including:

an image signal processing unit configured to input a high dynamic range (HDR) image and convert the HDR image into an SDR image having a narrower dynamic range than the HDR image, in which the image signal processing unit executes processing of converting a pixel value of the HDR image into a pixel value of the SDR image, applying one conversion matrix to low luminance region pixels having luminance that is a prescribed threshold or less among constituent pixels of the HDR image.

Further, a second aspect of the present disclosure is in an image processing apparatus including:

a matrix calculation unit configured to calculate a conversion matrix to be applied to image conversion processing of inputting a high dynamic range (HDR) image and converting the HDR image into an SDR image having a narrower dynamic range than the HDR image, in which the matrix calculation unit calculates the conversion matrix that is one common conversion matrix for converting a plurality of different pixel values of the HDR image into pixel values of the SDR image, and is a conversion matrix to be applied only to conversion of a pixel value that is a prescribed threshold or less among constituent pixels of the HDR image.

Further, a third aspect of the present disclosure is in an image processing method executed in an image processing apparatus, the image processing apparatus including an image signal processing unit configured to input a high dynamic range (HDR) image and convert the HDR image into an SDR image having a narrower dynamic range than the HDR image, in which the image signal processing unit executes processing of converting a pixel value of the HDR image into a pixel value of the SDR image, applying one conversion matrix to low luminance region pixels having luminance that is a prescribed threshold or less among constituent pixels of the HDR image.

Further, a fourth aspect of the present disclosure is in
an image processing method executed in an image processing apparatus,
the image processing apparatus including
a matrix calculation unit configured to calculate a conversion matrix to be applied to image conversion processing of inputting a high dynamic range (HDR) image and converting the HDR image into an SDR image having a narrower dynamic range than the HDR image, in which
the matrix calculation unit calculates the conversion matrix that is one common conversion matrix for converting a plurality of different pixel values of the HDR image into pixel values of the SDR image, and is a conversion matrix to be applied only to conversion of a pixel value that is a prescribed threshold or less among constituent pixels of the HDR image.

Further, a fifth aspect of the present disclosure is in
a program for causing an image processing apparatus to execute image processing,
the image processing apparatus including
an image signal processing unit configured to input a high dynamic range (HDR) image and convert the HDR image into an SDR image having a narrower dynamic range than the HDR image, in which
the program causes the image signal processing unit to execute processing of converting a pixel value of the HDR image into a pixel value of the SDR image, applying one conversion matrix to low luminance region pixels having luminance that is a prescribed threshold or less among constituent pixels of the HDR image.

Further, a sixth aspect of the present disclosure is in
a program for causing an image processing apparatus to execute image processing,
the image processing apparatus including
a matrix calculation unit configured to calculate a conversion matrix to be applied to image conversion processing of inputting a high dynamic range (HDR) image and converting the HDR image into an SDR image having a narrower dynamic range than the HDR image, in which
the program causes the matrix calculation unit to calculate the conversion matrix that is one common conversion matrix for converting a plurality of different pixel values of the HDR image into pixel values of the SDR image, and is a conversion matrix to be applied only to conversion of a pixel value that is a prescribed threshold or less among constituent pixels of the HDR image.

Note that the program of the present disclosure is, for example, a program that can be provided by a storage medium or a communication medium provided in a computer readable format to an information processing apparatus or a computer system that can execute various program codes. By providing such a program in the computer readable format, processing according to the program is realized on the information processing apparatus or the computer system.

Still other objects, features, and advantages of the present disclosure will become clear from more detailed description based on embodiments and attached drawings of the present disclosure described below. Note that the system in the present specification is a logical aggregate configuration of a plurality of devices, and is not limited to devices having respective configurations within the same housing.

Effects of the Invention

According to a configuration of an embodiment of the present disclosure, an apparatus and a method for generating a high quality SDR image without significant reduction in image average luminance are realized by matrix conversion for an HDR image.

Specifically, an image signal processing unit that converts the HDR image into the SDR image converts a pixel value of the HDR image into a pixel value of the SDR image, applying one conversion matrix to low luminance region pixels having luminance that is a prescribed threshold or less among constituent pixels of the HDR image. A high luminance region pixel having higher luminance than the prescribed threshold is set as a highest output pixel of the SDR image after conversion. The conversion matrix to be applied is a matrix having setting in which a change rate of a memory color set in a Macbeth color chart becomes smaller.

With the configuration, an apparatus and a method for generating a high quality SDR image without significant reduction in image average luminance are realized by matrix conversion for the HDR image.

Note that the effects described in the present specification are merely examples and are not limited, and additional effects may be exhibited.

BRIEF DESCRIPTION OF DRAWINGS

FIG. 5 is a diagram for describing image types and characteristics.

MODE FOR CARRYING OUT THE INVENTION

Hereinafter, an image processing apparatus, an image processing method, and a program of the present disclosure will be described in detail with reference to the drawings. Note that the description will be given according to the following items.

1. Outline of Image Display Processing in Image Processing Apparatus
2. Problems in HDR Image Output Processing for SDR Display Unit
3. Hybrid Log-Gamma HDR Image
4. Configuration to Execute Conversion from HDR Image into SDR Image, Applying Matrix Conversion
5. Matrix Conversion Processing Configuration In Which Deterioration of Luminance Level of SDR Image After Conversion is Prevented
6. Configuration Example of Image Processing Apparatus
7. Conclusion of Configurations of Present Disclosure

[1. Outline of Image Display Processing in Image Processing Apparatus]

First, a typical processing example of image display processing in an image processing apparatus will be described with reference to FIG. 1 and the following diagrams.

Figure 1:
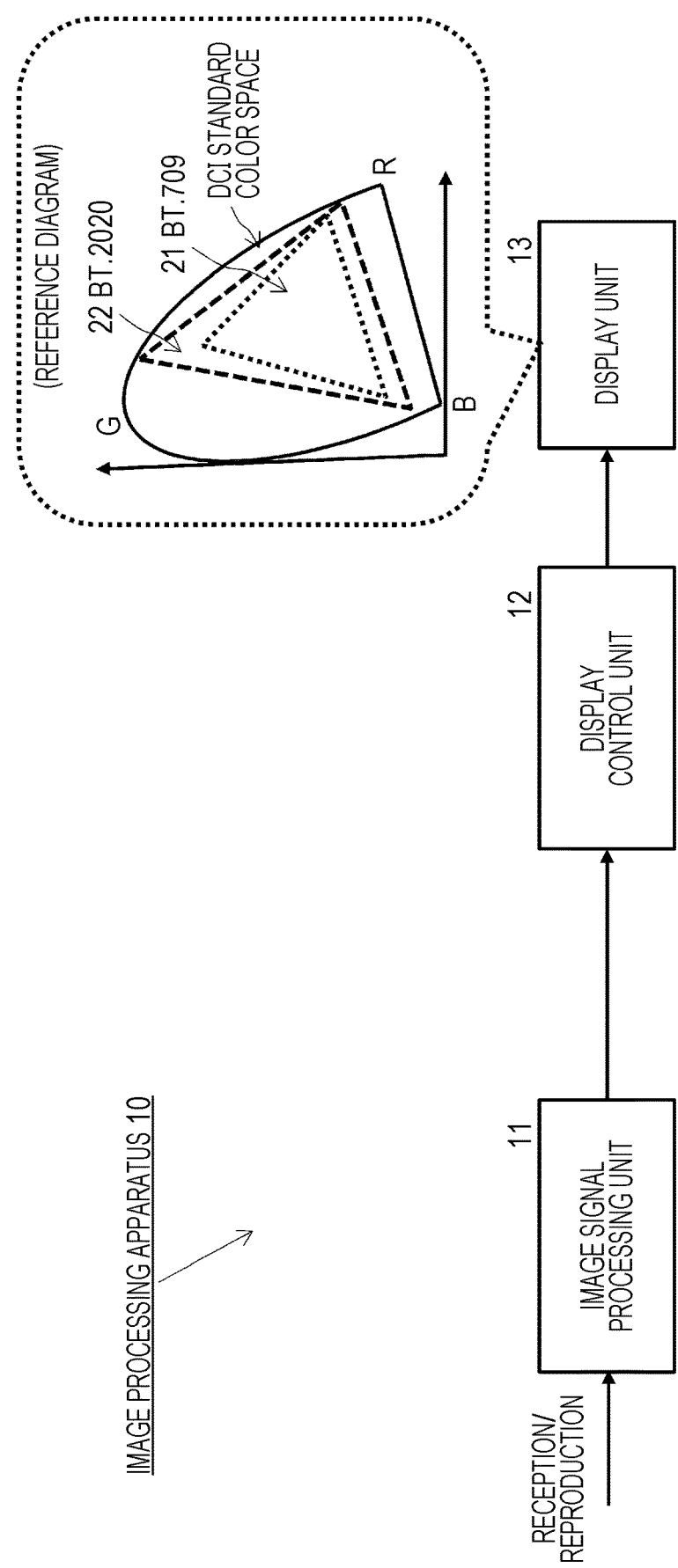
FIG. 1 is a diagram for describing a configuration and processing of an image processing apparatus.

An image processing apparatus 10 in FIG. 1 is a user apparatus (client) including a display unit such as a television, a smartphone, or a PC, for example.

The image processing apparatus 10 displays received image data from a broadcast station, a streaming server, or the like, or reproduced image data from a medium such as a Blu-ray (registered trademark) disc (BD) on a display unit 13, for example.

An image signal processing unit 11 decodes an encoded stream such as MPEG-2TS input from a broadcasting station, a server, or a medium such as a Blu-ray (registered trademark) disc (BD), and generates an image signal generated on the basis of decoded data to a display control unit 12, for example.

For example, the image signal processing unit 11 generates an output signal according to display characteristics of the display unit 13 and outputs the output signal to the display control unit 12.

The display control unit 12 generates an output signal to the display unit 13 on the basis of the input signal from the image signal processing unit 11.

The display unit 13 drives a display panel, using the input signal from the display control unit 12, and executes image display.

Image data constituting content provided by a broadcast station or a server or content stored in a medium has been changed to be higher quality images with the times. Specifically, the images have been being transitioned from earlier 2K images to high-resolution images called 4K images and 8K images.

Furthermore, use of high dynamic range (HDR) images that enable faithful reproduction of images in a wider luminance range from lower luminance to higher luminance than earlier standard dynamic range (SDR) images are becoming widespread.

An HDR image is an image having a wider expressible dynamic range than an SDR image and capable of expressing all the luminance in a visible range, and can support a dynamic range and color gamut substantially equivalent to human visual characteristics.

The (reference diagram) in FIG. 1, illustrated corresponding to the display unit 13, is a diagram for explaining the color gamut displayed on the display unit 13 and illustrating two color systems prescribed in a DCI standard color space.

An ITU-R BT.709 color system and an ITU-R BT.2020 color system that enables wider color expression are illustrated.

Both of these are color systems prescribed by International Telecommunication Union-Radio Communications Sector (ITU-R) that is a broadcast standard formulation organization.

The HDR image is output with a signal value of 10 to 12 bits obtained by nonlinearly converting the luminance using an optical-electro transfer function (OETF) conforming to ITU-R BT.2020, for example.

When a display unit (display) 53 is an HDR display unit capable of outputting a dynamic range corresponding to the HDR image, the HDR image is output as an image expressing correct luminance and color information without problems.

However, in a case where the display unit 13 is not compatible with HDR and is a display unit (SDR display unit) corresponding to the SDR image having narrower expressible luminance and color ranges than the HDR image, correct luminance and color information cannot be output, in some cases.

The image signal processing unit 11 of the image processing apparatus 10 illustrated in FIG. 1 generates the output signal according to the display characteristics of the display unit 13.

The display unit 13 drives the display panel, using the input signal, and executes the image display.

Figure 2:
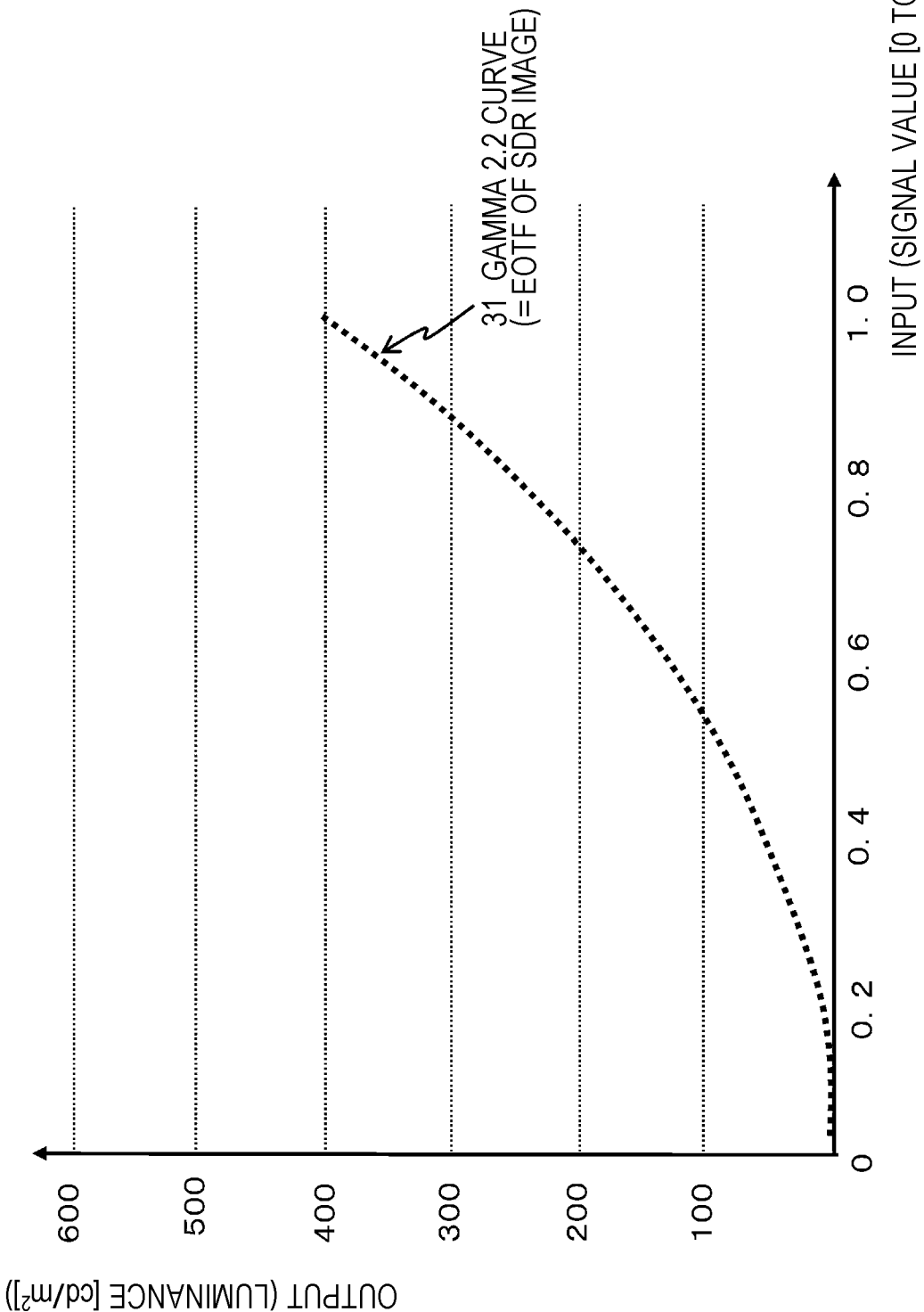
FIG. 2 is a diagram for describing an example of a gamma curve as input/output characteristics of an SDR display device.

For example, in a case where the display unit 13 is a display unit dedicated to the SDR image, the display unit 13 has input/output characteristics according to a gamma 2.2 curve 31 illustrated in FIG. 2.

In the graph illustrated in FIG. 2, the horizontal axis represents an input (signal value (0 to 1)) and the vertical axis represents an output (luminance ($cd/m^2$)), and the graph illustrates correspondence between the input (signal value) and the output (luminance). This graph is a graph illustrating an electro-optical transfer function (EOTF) for converting an input electrical signal into an output optical signal.

On the display constituting the display unit 13, in general, an "input value: Vin" and an "output value: Vout" are not in a linear relationship, and the relationship between the "input value: Vin" and the "output value: Vout" is expressed by an "exponentiation function" below.

$$V_{out} = V_{in}^\gamma$$

An exponent value γ of the exponentiation corresponds to a gamma value.

The curve 31 illustrated in FIG. 2 is a gamma 2.2 curve corresponding to a gamma value=2.2, and has input/output characteristics of a typical SDR display device.

The curve 31 has a relationship between an input x corresponding to the horizontal axis and an output y corresponding to the vertical axis, which is expressed by the following relational expression:

$$y = x^{2.2}$$

The curve 31 is also called 2.2 squared curve and is a gamma 2.2 curve exhibiting input/output characteristics of many of typical SDR display devices (the gamma value=2.2), which are currently often used.

A gamma correction signal that is an output signal to a typical SDR display device having the display characteristics according to the gamma 2.2 curve will be described with reference to FIG. 3.

Figure 3:
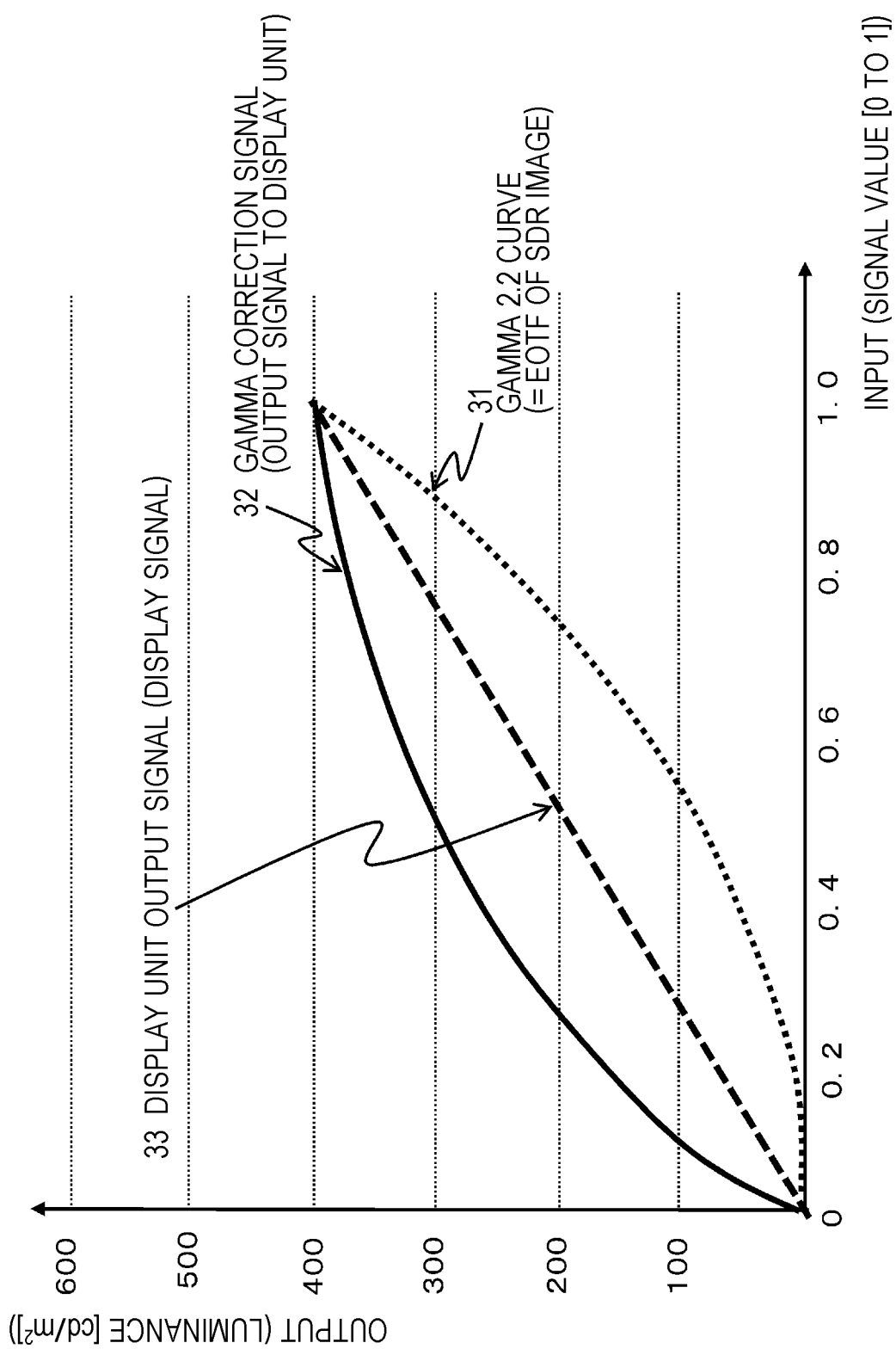
FIG. 3 is a diagram for describing an example of a gamma curve, a gamma correction curve, and a display unit output signal.

As illustrated in FIG. 3, a gamma correction signal 32 having inverse characteristics to the gamma 2.2 curve illustrated in FIG. 3 is output to the SDR display unit in which the input/output characteristics are expressed by the gamma 2.2 curve 31, whereby a display unit output 33 in which an output (a luminance value or a color value) of the display unit is linear with respect to the input signal can be obtained.

By performing the display unit output using the gamma correction signal in this way, the correspondence between the input signal and the output signal (the luminance value or the color value) becomes linear, and an image in which luminance and color expression possessed by an input image are correctly expressed can be displayed.

[2. Problems in HDR Image Output Processing for SDR Display Unit]

The processing described with reference to FIG. 3 is a processing example using the gamma correction signal generated corresponding to the gamma 2.2 curve that is the display unit characteristics of the SDR display unit. In this case, the SDR image displayed on the SDR display unit correctly expresses the luminance and color expression possessed by an original input SDR image.

However, the HDR image having a wider dynamic range than the SDR image has completely different image characteristics from the SDR image.

The image characteristics of the HDR image and the SDR image will be described with reference to FIG. 4.

Figure 4:
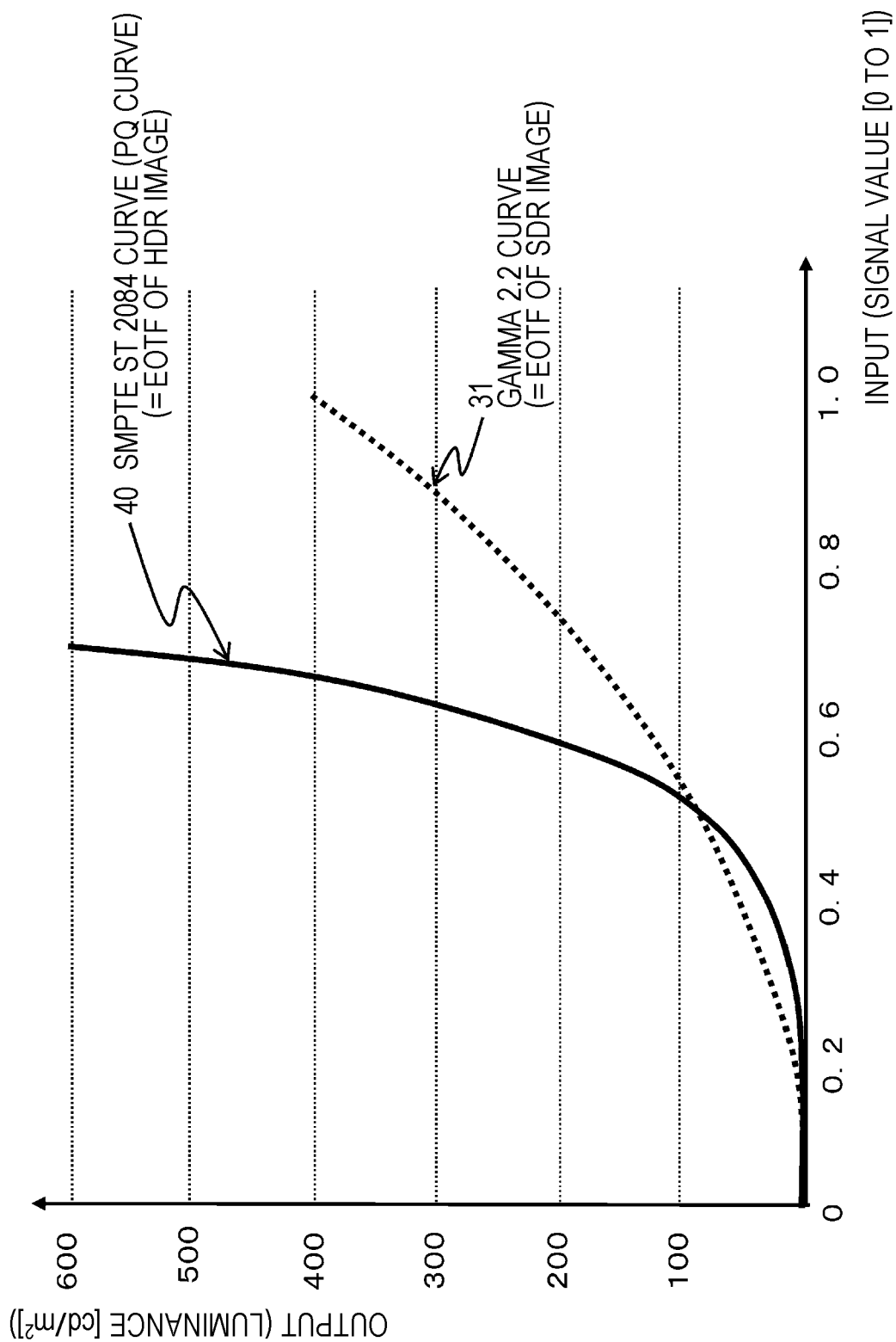
FIG. 4 is a diagram for describing a difference in characteristics between an HDR image and an SDR image.

In the graph illustrated in FIG. 4, the horizontal axis represents an input (signal value (0 to 1)) and the vertical axis represents an output (luminance (cd/m²)), and the graph illustrates correspondence between the input (signal value) and the output (luminance). This graph is a graph illustrating an electro-optical transfer function (EOTF) for converting an input electrical signal into an output optical signal.

FIG. 4 illustrates a gamma 2.2 curve 31 corresponding to the image characteristics of the SDR image (=display characteristics of the SDR display device) and an SMPTE ST 2084 curve 40 corresponding to the image characteristics of the HDR image (=display characteristics of an HDR display device). The SMPTE ST 2084 curve 40 is a curve prescribed as a standard of Society of Motion Picture and Television Engineers (SMPTE).

The SMPTE ST 2084 curve 40 is one representative characteristic curve of the HDR image and is a curve prescribed as a standard of Society of Motion Picture and Television Engineers (SMPTE).

Note that the SMPTE ST 2084 curve is also called perceptual quantization (PQ) curve.

The SMPTE ST 2084 curve (PQ curve) is used for generating encoded data corresponding to a dynamic range of a luminance range: 0.05 to 10,000 Nit constituting the HDR image. Specifically, the dynamic range of the luminance range: 0.05 to 10,000 Nit constituting the HDR image is converted according to the SMPTE ST 2084 curve 40 defined as a curve of a quantization step tailored to human eyes, thereby an image signal falling within a predetermined-bit (for example, twelve-bit) gradation can be generated.

As is clear from FIG. 4, the expressible luminance range of the HDR image is much larger than the expressible luminance range of the SDR image. That is, a high dynamic range is realized.

However, as illustrated in FIG. 4, the gamma 2.2 curve corresponding to the SDR image and the SMPTE ST 2084 curve corresponding to the HDR image have completely different characteristics.

In the future, when the number of HDR image content is increased, two cases will occurs, where an image input by the image signal processing unit 11 of the image processing apparatus 10 described with reference to FIG. 1 is the SDR image or the HDR image.

That is, the image processing apparatus 10 displays image content including either the SDR image signal or the HDR image signal on the display unit 13.

However, at present, display devices (displays) held by many user apparatus are display devices not compatible with HDR images. That is, SDR display units compatible with SDR images, which cannot display high dynamic range images prescribed in the HDR images, are widely used, under existing circumstances.

In a case where the display unit 13 of the image processing apparatus 10 is the SDR display unit compatible with the SDR image, if an input image of the image processing apparatus 10 is the SDR image, the gamma correction signal corresponding to the gamma 2.2 curve above described with reference to FIGS. 2 and 3 is generated, whereby an image in which the luminance and color expression possessed by the original SDR image are correctly expressed can be output to the display unit.

However, in the case of inputting the HDR image having a wider dynamic range than the SDR image and having characteristics corresponding to the SMPTE ST 2084 curve illustrated in FIG. 4, a display signal 103 having a linear relationship between the input (signal) and the output (luminance or color) described with reference to FIG. 3 is not generated even if processing similar to the processing for the SDR image is performed. Therefore, the problem that the luminance and color of the HDR image are not reproduced and the image quality is degraded occurs.

[3. Hybrid Log-Gamma HDR Image]

As described above, in the HDR method using the SMPTE ST 2084 curve as the signal conversion function, the SDR display device that supports only the display processing of the SDR image has the problem that the image quality is degraded to a level that cannot be viewed.

In the case of capturing, transmitting, or outputting the HDR image or the SDR image, a capture device or a broadcast station side needs processing of converting an optical signal corresponding to a captured image into an electrical signal and transmitting the electrical signal, and further converting an electrical signal into an optical signal by a display device such as a television and outputting the optical signal.

As a signal conversion function required for the processing, an optical-electro transfer function (OETF) for converting an optical signal into an electrical signal, an electro-optical transfer function (EOTF) for converting an electrical signal into an optical signal are used.

A mode of an image to be output to the display unit such as a television is determined depending on what function is used as the signal conversion function such as the optical-electro transfer function (OETF) or the electro-optical transfer function (EOTF).

The ITU-R, which is a broadcast standard formulation organization described above, plans to standardize a plurality of different methods using different functions as the signal conversion function (OETF/EOTF) to be applied to the transmission and output of the HDR image.

These standards will be described with reference to FIG. 5.

ITU-R plans to standardize the following two methods for the HDR image.

(a) Application 1 (Application1) (=SMPTE ST 2084 curve application)

(b) Application 2 (Application2) (=hybrid log-gamma curve application)

(a) Application 1 (Application1) is an HDR method using the SMPTE ST 2084 curve described with reference to FIG. 4 as the signal conversion function.

Meanwhile, (b) Application 2 (Application2) is an HDR method using a hybrid log-gamma (HLG) curve that is a combination of a gamma curve and a log curve as the signal conversion function.

(a) Application 1 (Application1) is a so-called absolute value method that enables expression of an absolute value of the luminance of a capture environment on the display unit, and can express absolute luminance up to 10,000 cd/m$^2$.

Meanwhile, (b) Application 2 (Application2) is a relative value system that enables display of an image at a relative luminance level according to the display characteristics of the display unit, and can express the relative luminance that is twelve times of prescribed reference white, for example.

(a) Application 1 (Application1), which is an absolute value method, can output an HDR image with a wide dynamic range in an HDR television that supports HDR image output with a high upper limit of output luminance, but (a) Application 1 cannot display a natural image on a conventional SDR television with a low upper limit of output luminance.

Meanwhile, an HDR image according to (b) Application 2 (Application2), which is a relative value method, can be output as a display image viewable in a luminance range displayable on both an HDR television and an SDR television.

That is, the HDR image with a wide dynamic range can be output on the HDR television supporting the HDR image output with a high upper limit of output luminance.

Furthermore, the display image can be displayed and viewed even on the conventional SDR television with a low upper limit of output luminance as a pseudo SDR image within the luminance range outputtable by the SDR television.

FIG. 5 is a diagram illustrating examples of images that may be displayed on the display device such as a television in the future.

As illustrated in FIG. 5, there are the following three types of images that may be displayed on the display device such as a television in the future.

(1) HDR1

(2) HDR2

(3) SDR (1) Image type=HDR 1 is an HDR image corresponding to the application 1 (Application1) of the ITU-R standard described above, and the conversion function to be applied to the signal conversion (OETF/EOTF) is a function prescribed by the SMPTE ST 2084 curve, for example.

(2) Image type=HDR 2 is an HDR image corresponding to the application 2 (Application2) of the ITU-R standard described above, and the conversion function to be applied to the signal conversion (OETF/EOTF) is a function prescribed by the hybrid log-gamma (HLG) curve, for example.

Note that the HDR2 image can be displayed as the HDR image with a high dynamic range on the HDR television having a display function of the HDR2 image, as described above. Further, the HDR2 image can be displayed as a pseudo SDR image on the SDR television without having the display function of the HDR2 image.

(3) Image type=SDR is conventional image data having a smaller dynamic range than the HDR image, and the conversion function to be applied to the signal conversion (OETF/EOTF) is prescribed by the gamma 2.2 curve, for example.

The HDR 2 (application 2) illustrated in FIG. 5 (2) can output an HDR image with a wide dynamic range on an HDR television that is expected to become popular in the future, that is, an HDR television having a high upper limit of output luminance.

Furthermore, the display image can be output and viewed even on the conventional SDR television with a low upper limit of output luminance as a pseudo SDR image in the luminance range outputtable by the SDR television, and is expected to be used in broadcasting and other media in many ways.

Figure 6:
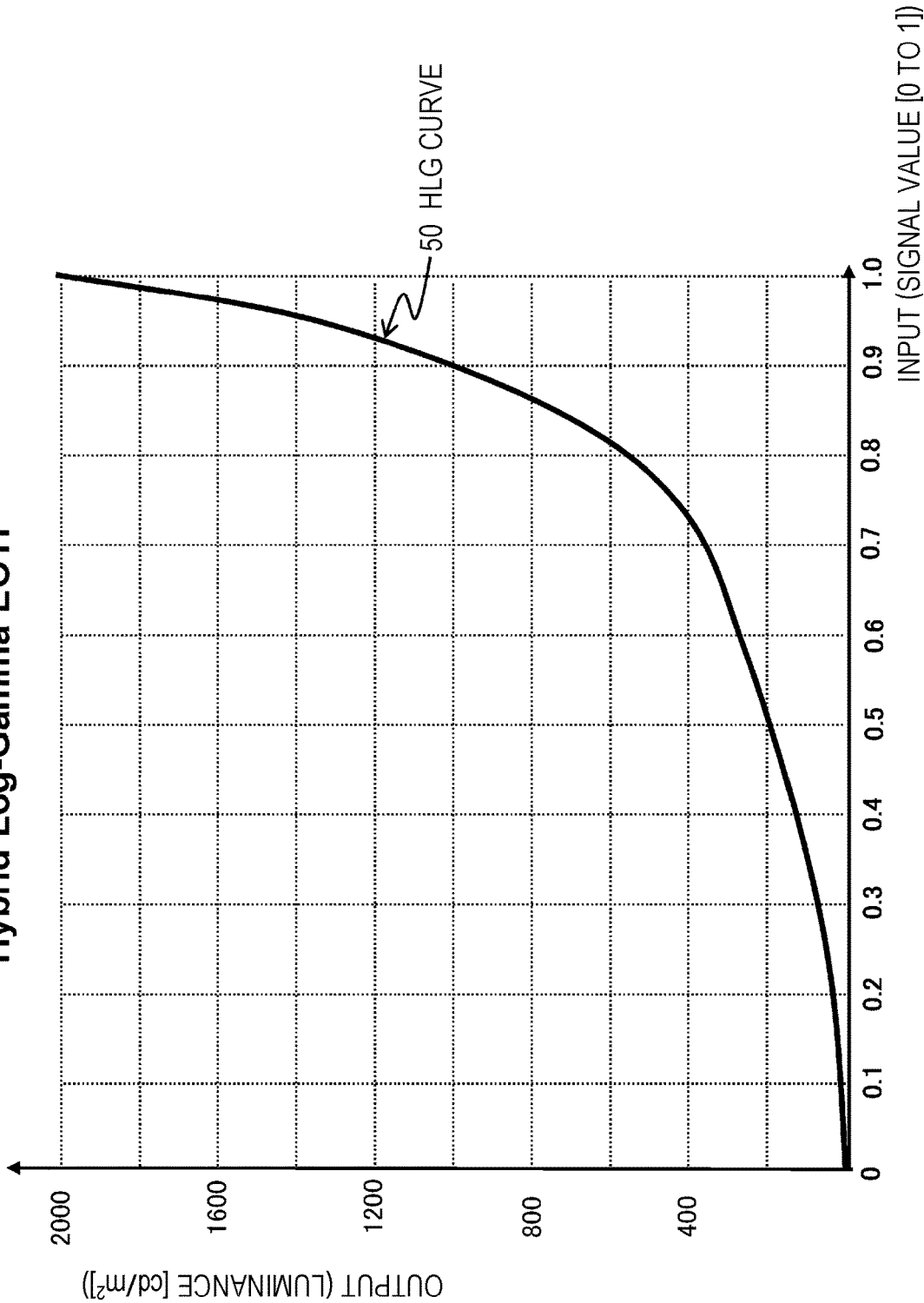
FIG. 6 is a diagram for describing a hybrid log-gamma (HLG) curve that is input/output characteristics of an HDR image.

FIG. 6 illustrates an example of the hybrid log-gamma (HLG) curve that is the signal conversion function to be applied to the HDR 2 (application 2) illustrated in FIG. 5 (2).

In a hybrid log-gamma (HLG) curve 50 illustrates in FIG. 6, the horizontal axis represents an input (signal value (0 to 1)) and the vertical axis represents an output (luminance (cd/m$^2$)), and the hybrid log-gamma (HLG) curve 50 is a graph illustrating correspondence between the input (signal value) and the output (luminance), similarly to FIG. 4 described above. This graph is a graph illustrating an electro-optical transfer function (EOTF) for converting an input electrical signal into an output optical signal.

An example of processing for displaying the HDR image having the input/output characteristics illustrated in FIG. 6 on the SDR display unit will be described with reference to FIG. 7.

Figure 7:
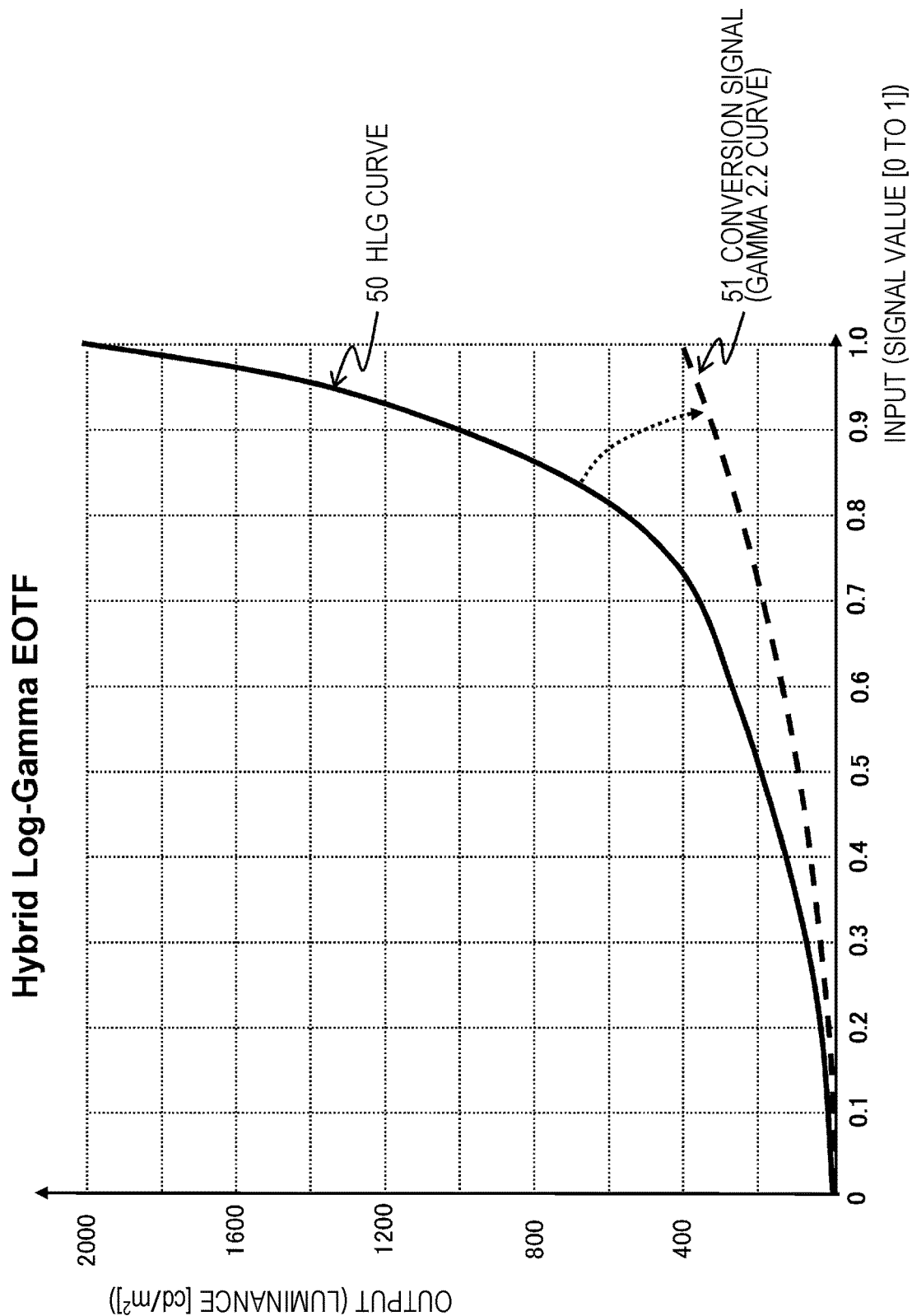
FIG. 7 is a diagram for describing a conversion processing example of an HDR image having input/output characteristics according to a hybrid log-gamma (HLG) curve into an SDR image.

To output and display the HDR image having the input/output characteristics (EOTF) according to the hybrid log-gamma (HLG) curve 50 illustrated in FIG. 7 to the SDR display device as the pseudo SDR image, the HDR curve 50 illustrated in FIG. 7 needs to be converted into a conversion signal 51 having the input/output characteristics adapted to the display characteristics of the SDR display unit, that is, the conversion signal 51 having the input/output characteristics according to the gamma 2.2 curve illustrated in FIG. 7 and to be input to the display unit.

An example of this signal conversion processing will be described with reference to FIG. 8.

Figure 8:
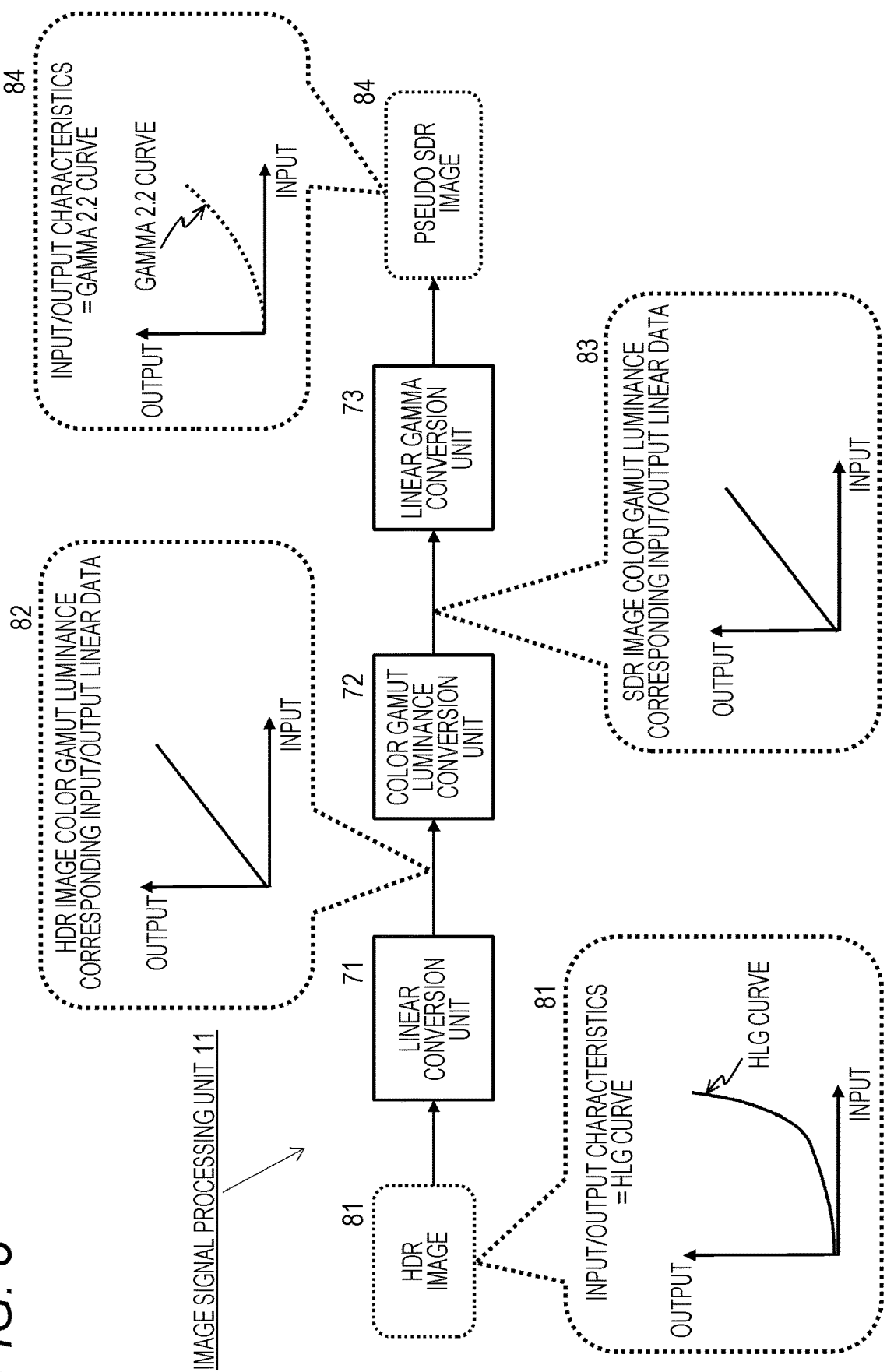
FIG. 8 is a diagram for describing a conversion processing example of an HDR image having the input/output characteristics according to the hybrid log-gamma (HLG) curve into an SDR image.

FIG. 8 is a diagram for describing a configuration and processing of the image signal processing unit 11 of the image processing apparatus 10 illustrated in FIG. 1.

As illustrated in FIG. 8, the image signal processing unit 11 includes a linear conversion unit 71, a color gamut luminance conversion unit 72, and a linear gamma conversion unit 73.

An HDR image 81 having the input/output characteristics (EOTF) according to the hybrid log-gamma (HLG) curve 50 described with reference to FIGS. 6 and 7 is input to the linear conversion unit 71.

The linear conversion unit 71 executes linear conversion for the input/output characteristics according to the hybrid log-gamma (HLG) curve 50 to make the input/output relationship linear.

HDR image color gamut luminance corresponding input/output linear data 82 illustrated in FIG. 8 is generated by the linear conversion. This linear data is input to the color gamut luminance conversion unit 72.

The color gamut luminance conversion unit 72 executes processing of resetting the output color and luminance for the input value according to the display characteristics of the display unit 13 capable of displaying only SDR images.

That is, the processing is to convert the color gamut and luminance of the input image according to displayable color gamut and luminance of the display unit 13.

To accurately perform this conversion processing, the processing is performed using the input/output relationship as linear data.

As a result of the processing, SDR image color gamut luminance corresponding input/output linear data 83 illustrated in FIG. 8 is generated. This linear data is input to the linear gamma color conversion unit 73.

The linear gamma color conversion unit 73 executes linear gamma conversion processing of setting the SDR image color gamut luminance corresponding input/output linear data 83 in which the input/output relationship is set as linear data to the input/output relationship according to the gamma 2.2 curve.

By the processing, a pseudo SDR image 84 illustrated in FIG. 8 is generated and output to the display unit 13 via the display control unit 12.

As illustrated in FIG. 8, the pseudo SDR image 84 has input/output characteristics according to the gamma 2.2 curve and is image data displayable as the SDR image on the SDR display unit. The display unit 13 can display the input pseudo SDR image 84 as the SDR image.

However, in this series of processing, linear conversion processing, color gamut luminance conversion processing, and linear gamma conversion processing need to be executed for the input signal (HDR image 81), and there is a problem that a processing load is large and processing becomes difficult in a device having small data processing function and memory capacity. There is also a problem that the processing time becomes long and the delay of display timing becomes large.

[4. Configuration to Execute Conversion from HDR Image into SDR Image, Applying Matrix Conversion]

As described above, there is a configuration to execute the series of processing illustrated in FIG. 8 as a processing configuration to display the SDR image converted from the HDR image on the SDR display unit capable of displaying only SDR images.

However, the configuration illustrated in FIG. 8 has the problems that the linear conversion processing, the color gamut luminance conversion processing, and the linear gamma conversion processing are required for the input signal (HDR image 81), and the processing load is large and the processing time is long.

Hereinafter, a configuration and processing of the image processing apparatus of the present disclosure that solves the problems will be described.

Figure 9:
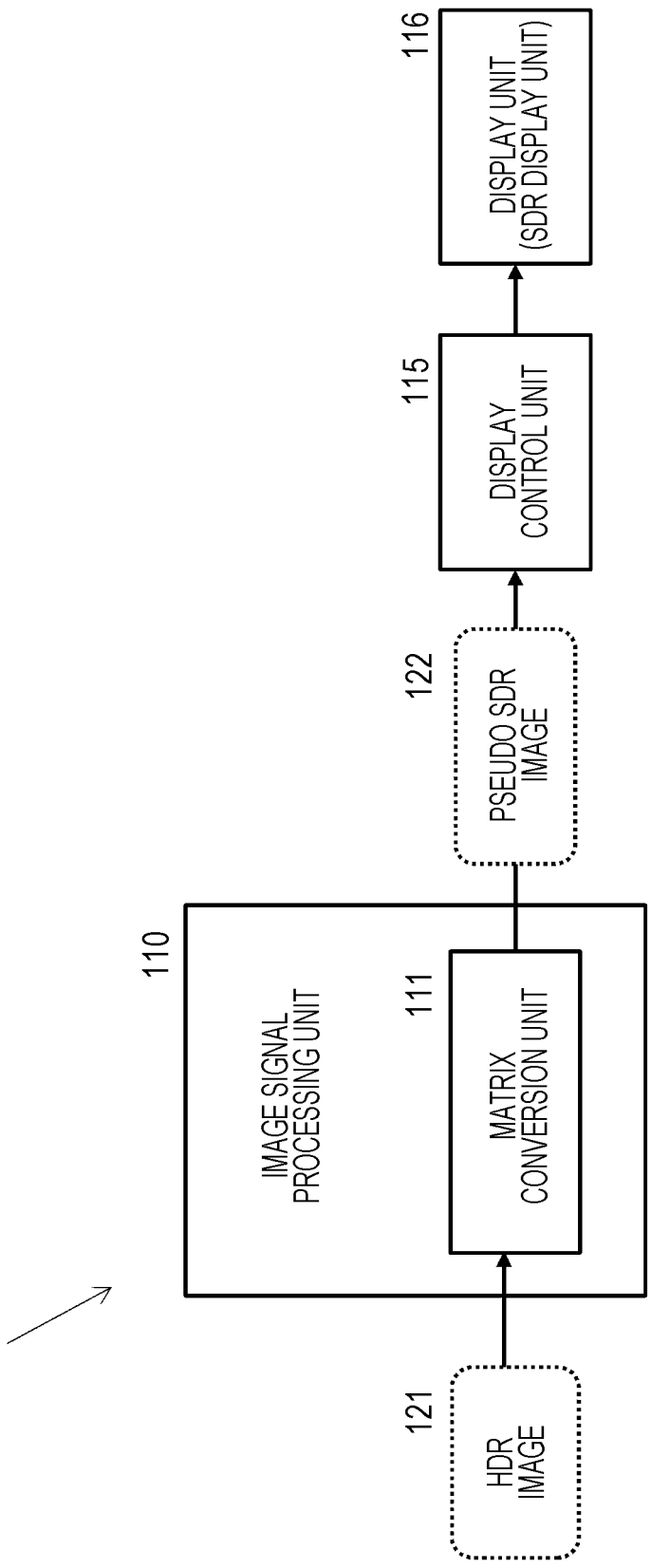
FIG. 9 is a diagram for describing the image processing apparatus that executes conversion of an HDR image having the input/output characteristics according to the hybrid log-gamma (HLG) curve into an SDR image.

FIG. 9 is a diagram illustrating a configuration example of the image processing apparatus 100 according to the present disclosure.

An image processing apparatus 100 in FIG. 9 is a user apparatus (client) including a display unit such as a television, a smartphone, or a PC, for example.

The image processing apparatus 100 displays received image data from a broadcast station, a streaming server, or the like, or reproduced image data from a medium such as a Blu-ray (registered trademark) disc (BD) on a display unit 116, for example.

An image signal processing unit 110 decodes an encoded stream such as MPEG-2TS input from a broadcasting station, a server, or a medium such as a Blu-ray (registered trademark) disc (BD), and outputs an image signal generated on the basis of a decoded data to a display control unit 115, for example.

For example, the image signal processing unit 110 generates an output signal according to display characteristics of the display unit 116 and outputs the output signal to the display control unit 115.

The display control unit 115 generates an output signal to the display unit 116 on the basis of the input signal from the image signal processing unit 110.

The display unit 116 drives a display panel, using the input signal from the display control unit 115, and executes image display.

In the example illustrated in FIG. 9, the image signal processing unit 110 includes a matrix conversion unit 111.

The matrix conversion unit 111 executes pixel value conversion for each of pixel values of an HDR image 121, applying one matrix, to generate a technician SDR image 122 as a conversion result.

The processing of the matrix conversion unit 111 of the image signal processing unit 110 will be described with reference to FIG. 10.

The matrix conversion unit 111 of the image signal processing unit 110 inputs the HDR image 121 as an input image.

Figure 10:
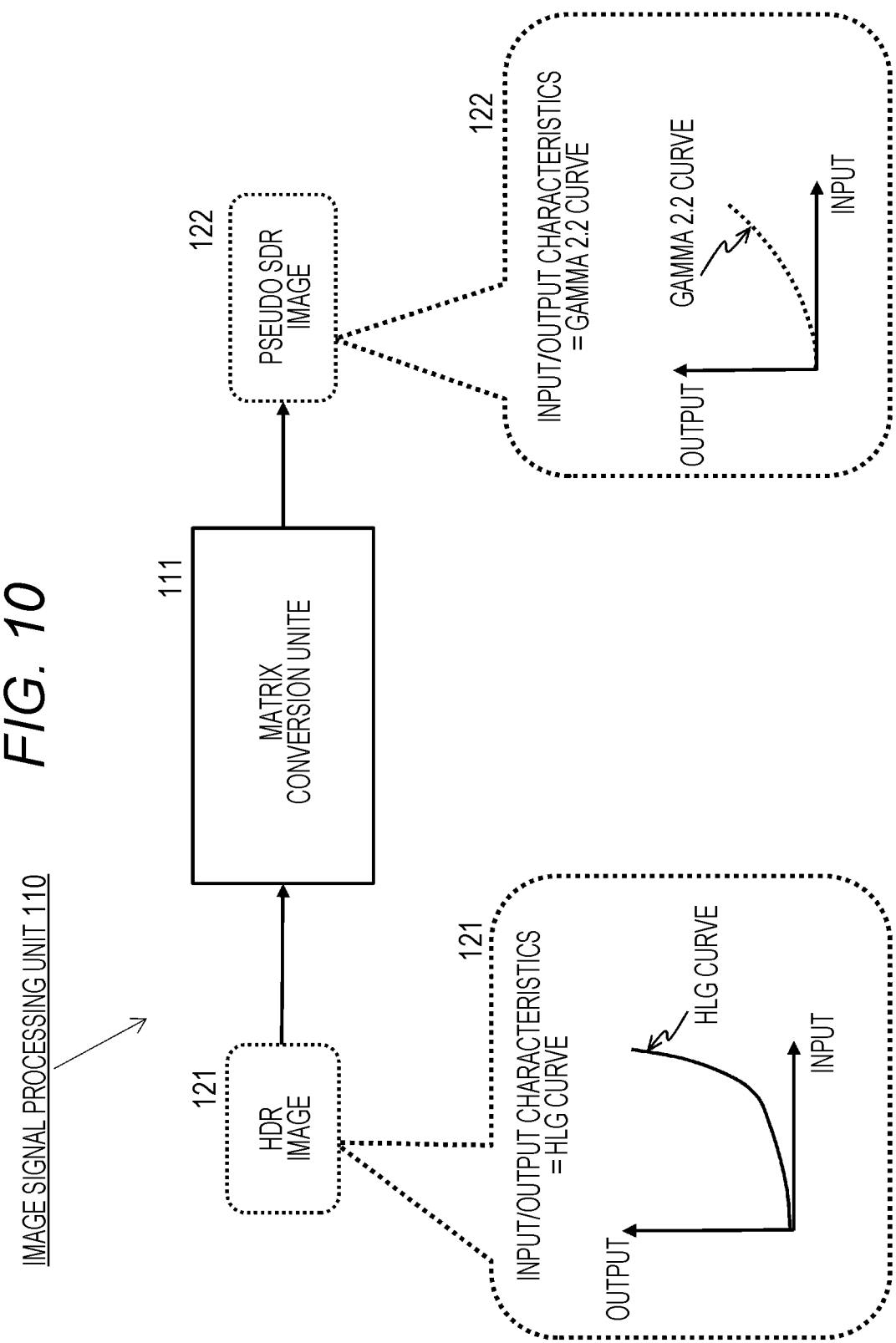
FIG. 10 is a diagram for describing processing of a matrix conversion unit.

The HDR image is, as illustrated in FIG. 10, HDR image data having the input/output characteristics according to the hybrid log-gamma (HLG) curve above described with reference to FIG. 6.

The matrix conversion unit 111 of the image signal processing unit 110 executes the pixel value conversion for each of the pixel values of the HDR image 121, applying one matrix.

As a pixel value conversion result, the pseudo SDR image 122 illustrated in FIG. 9 is generated.

The input HD image 121 is an image having an output luminance level and an output color gamut of a high dynamic range unique to HDR.

However, the pseudo SDR image 122 generated by the matrix conversion in the matrix conversion unit 111 of the image signal processing unit 110 is an image having an output luminance level and color gamut of the dynamic range allowed as the SDR image.

That is, as illustrated in FIG. 10, the input/output characteristics of the pseudo SDR image 122 are characteristics according to the gamma 2.2 curve described with reference to FIG. 2 and the like, and can be displayed and viewed as the SDR image on the display unit 116 capable of displaying only SDR images.

However, there is a problem that the image quality of the image generated by the matrix conversion, that is, the pseudo SDR image 122 is lowered in brightness in whole.

An example of processing of generating the pseudo SDR image from the HDR image by the pixel value conversion using the matrix will be described with reference to FIG. 11.

The input/output characteristics of the HDR image are characteristics according to a hybrid log-gamma (HLG) curve 201 illustrated in FIG. 11 above described with reference to FIG. 6 and the like.

Figure 11:
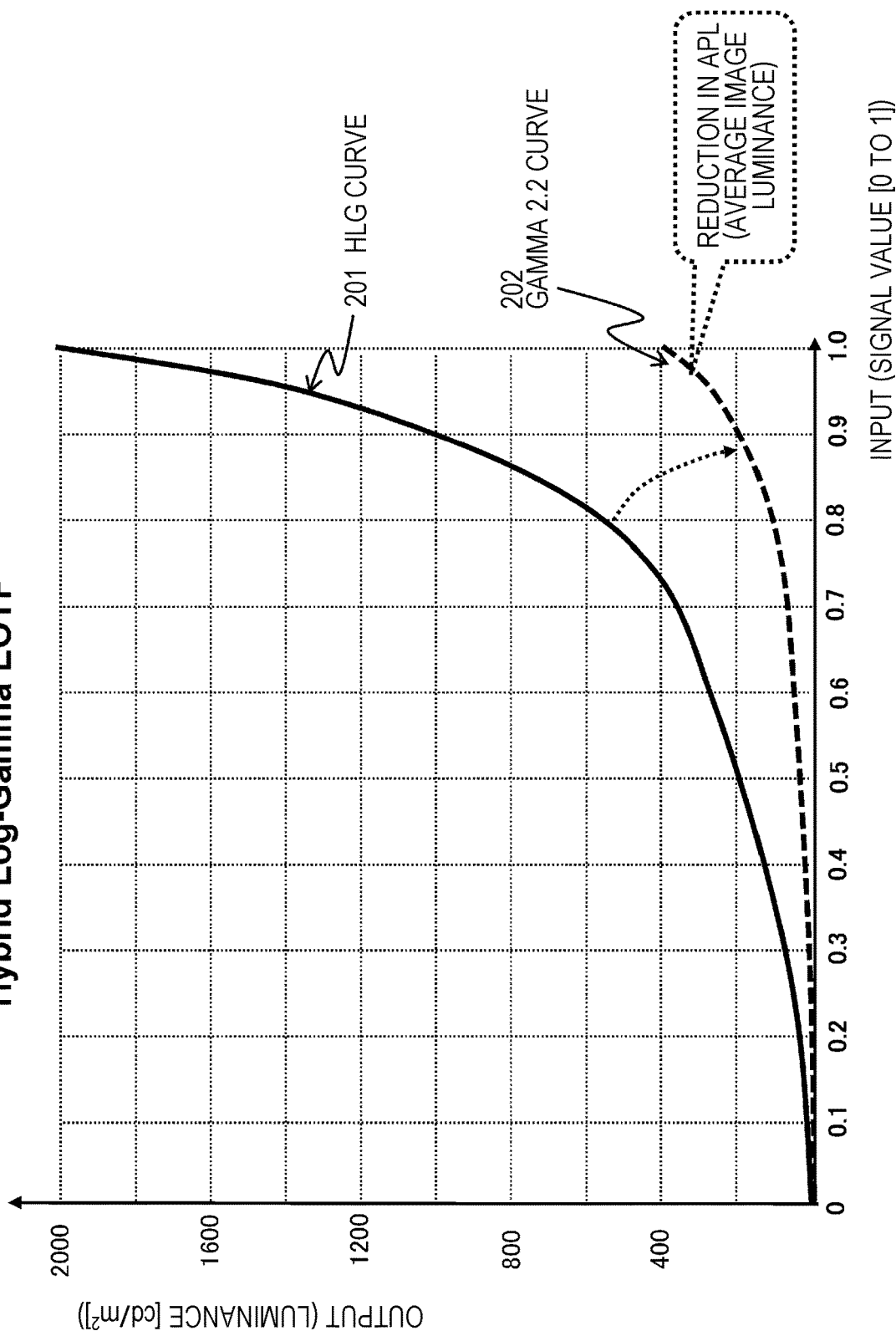
FIG. 11 is a diagram for describing processing of the matrix conversion unit.

When the pixel values of the HDR image having the characteristics are converted using a certain matrix into the SDR image having the characteristics according to the gamma 2.2 curve corresponding to the input/output characteristics of the SDR image, the characteristics of the SDR image after conversion become characteristics according to a gamma 2.2 curve 202 illustrated in FIG. 11, for example.

As is clear from FIG. 11, when comparing the HLG curve 201 and the gamma curve 202, the gamma curve 202 is lowered in output luminance in whole, as compared with the HLG curve 201.

This is because the pixel value conversion of lowering the output value of the HDR image before conversion to an allowable output value of the SDR image or less over the input signal values 0 to 1, that is, matrix conversion processing has been performed.

Specifically, one matrix in which a parameter to lower the maximum luminance of the HDR image illustrated in FIG. 11, for example, the matrix luminance 2000 cd/m² of the input signal=1.0 illustrated in FIG. 11 to the maximum luminance corresponding to the input signal 1.0 of the SDR image after conversion, that is, about 400 cd/m² is set is generated.

When the pixel value conversion is performed similarly applying the matrix to the HDR image output values with respect to the input signals 0 to 1.0, the output values of the generated SDR image with respect to the input signals 0 to 1 are lowered in whole, and as a result, the pseudo SDR image having the characteristics with a lowered output level as illustrated in FIG. 11 is generated.

Note that there is an average picture level (APL) illustrated in FIG. 11 as an index value indicating average luminance of an image. The APL is an average luminance index value of an image, and when the image conversion applying the matrix having the setting of converting the maximum luminance of the HDR image into the maximum luminance of the SDR image is executed, a problem that the average image luminance (APL) is lowered and an SDR image that is dark in whole is generated and output occurs.

[5. Matrix Conversion Processing Configuration in Which Deterioration of Luminance Level of SDR Image After Conversion is Prevented]

Next, a configuration and processing of an image processing apparatus that generates a bright SDR image after conversion without lowering the luminance level of the SDR image, in the configuration to convert the pixel values of the HDR image using the matrix and generate the pseudo SDR image displayable on the SDR display unit, will be described.

A conversion processing mode for executing the matrix conversion for the HDR image and executing the image conversion without lowering the luminance level of the SDR image after conversion will be described with reference to FIG. 12 and the following diagrams.

Figure 12:
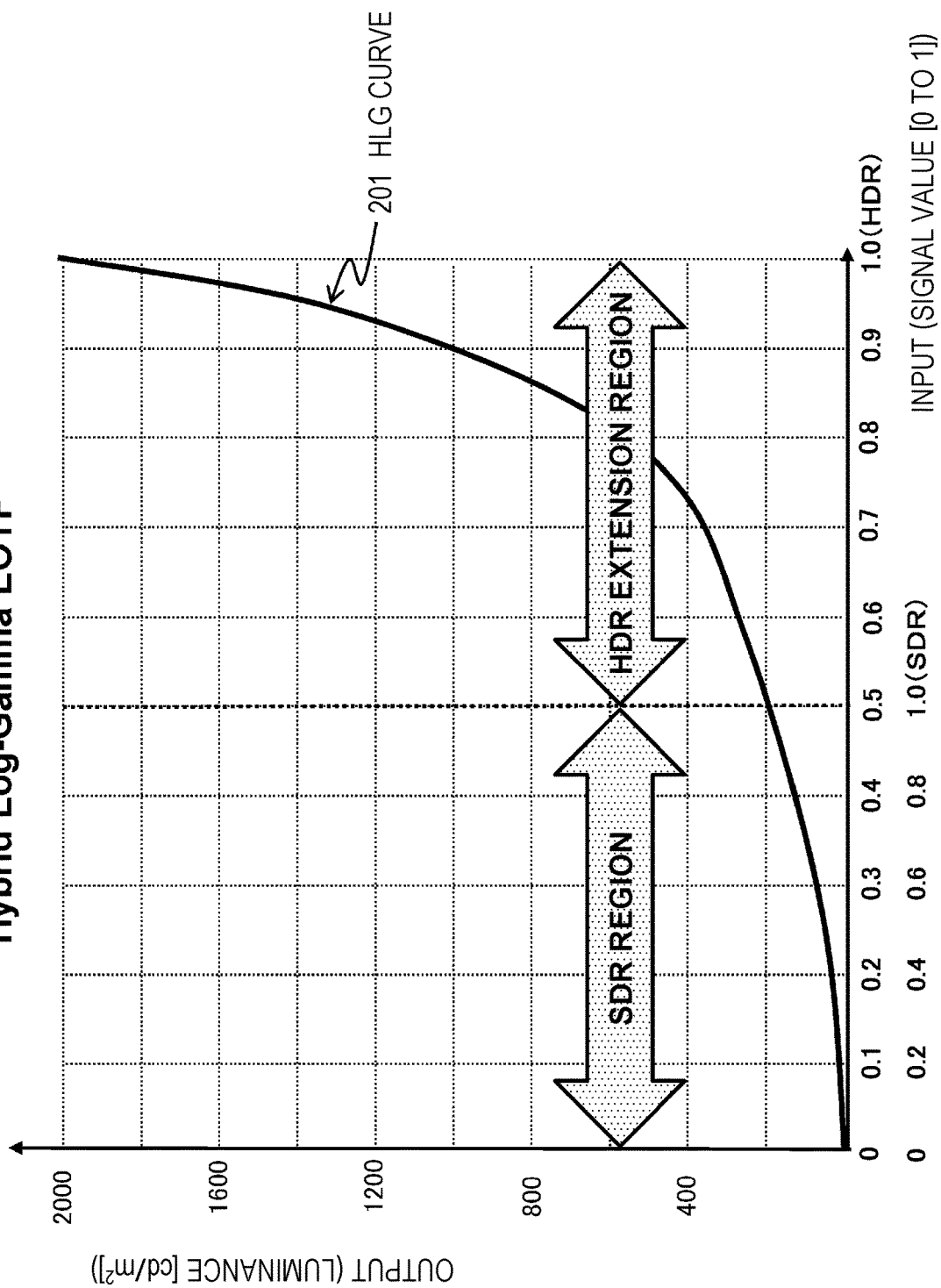
FIG. 12 is a diagram for describing processing of the matrix conversion unit executed by the image processing apparatus of the present disclosure.

FIG. 12 illustrates the hybrid log-gamma (HLG) curve 201 that is an input/output characteristic curve of the HDR image to be converted.

The horizontal axis represents the input signal 0 to 1.0, and the vertical axis represents the output (luminance: cd/m²)

In the processing of generating the matrix to be applied to the image conversion (HDR→SDR) of the image processing apparatus, the HLG curve 201 that is a characteristic curve of the HDR image is divided into two regions of an SDt region and an HDR extension region, as illustrated in FIG. 12.

The SDR region is a region of a low luminance level where the luminance level of the output signal is relatively low and is a region corresponding the input value=0 to 0.5, of the input values (0 to 1.0) of the HDR image.

Further, the HDR extension region is a region of a high luminance level where the luminance level of the output signal is relatively high and is a region corresponding the input value=0.5 to 1.0, of the input values (0 to 1.0) of the HDR image.

A region boundary, that is, an input value position of the input value=0.5 of the HDR image is set to a maximum input value of the SDR image after conversion, that is, the input value=1.0.

The input value=1.0 of the SDR image corresponds to a maximum value of RGB values of the SDR image, and an output pixel value corresponds to "white" set to an RGB maximum level (max).

In the case of converting the pixel values of the HDR image into the pixel values of the SDR image, a processing object of the matrix conversion to which the matrix is applied is only data in the SDR region in the HLG curve 201.

The matrix conversion is not performed for a high luminance region outside the SDR region in the HLG curve 201, that is, HDR pixels in the HDR extension region illustrated in FIG. 12, and all the HDR pixels are output as the highest luminance (white) in the SDR image after conversion.

Figure 13:
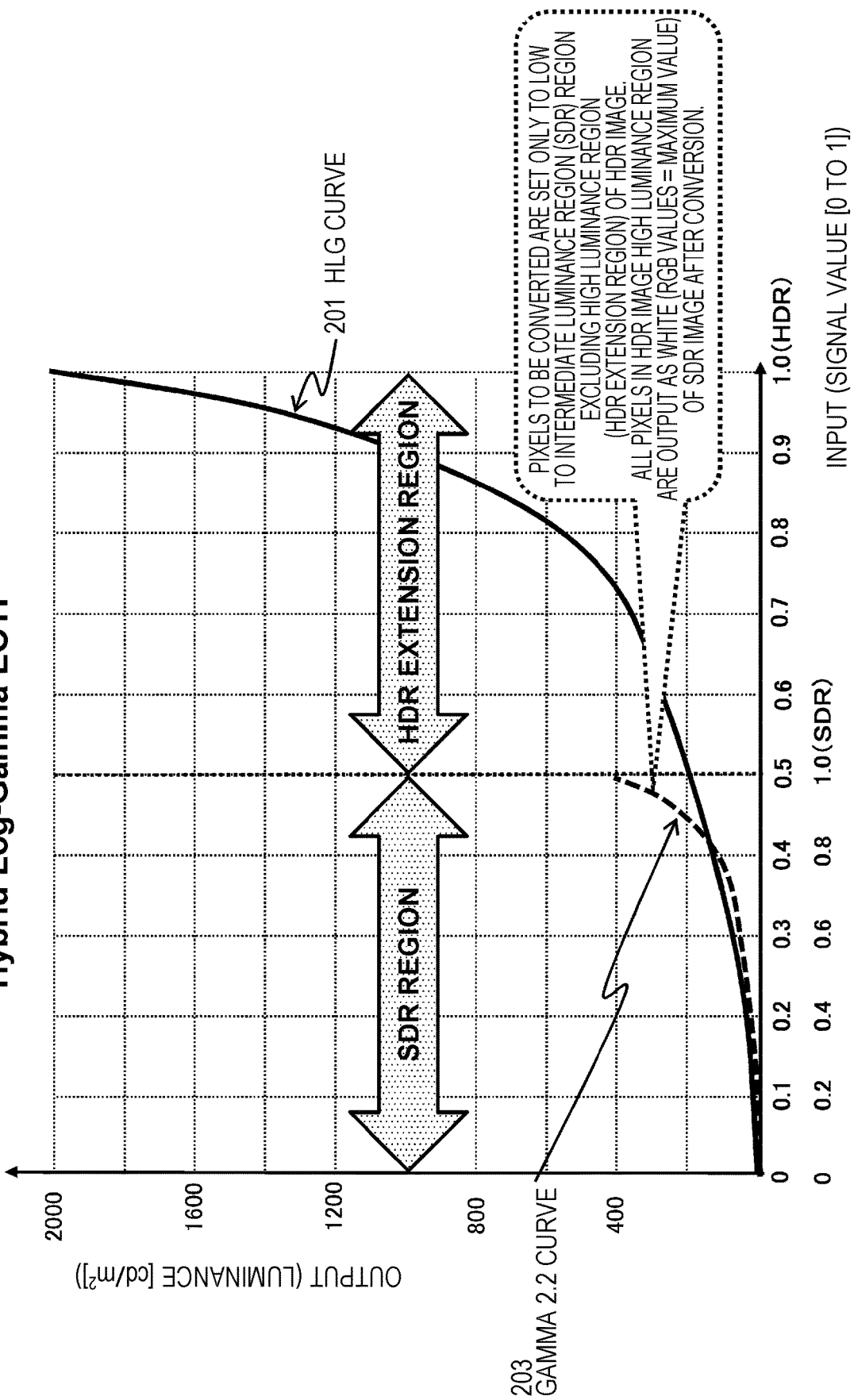
FIG. 13 is a diagram for describing processing of the matrix conversion unit executed by the image processing apparatus of the present disclosure.

FIG. 13 illustrates an example of a characteristic curve corresponding to the SDR image generated by the matrix conversion, that is, a gamma 2.2 curve 203.

The gamma 2.2 curve 203 illustrated in FIG. 13 corresponds to the input/output characteristics of the SDR image generated by the pixel value conversion applying one matrix to the pixel values of the SDR region of the HDR image according to the HLG curve 201 of the HDR input signals 0 to 0.5.

Note that the matrix applied to matrix change is one matrix, and a matrix satisfying the following conditions is used.

(Condition 1) A matrix in which the value of the input signal of the HDR image at a boundary position between the SDR region and the HDR extension region is set to "white" in which the input signal of the SDR image=1.0 (maximum value), that is, reference white.

(Condition 2) A matrix in which a change rate by the matrix conversion, of specific colors of the SDR image, for example, at least a part of memory colors #01 to #06 of Macbeth color chart, for example, the memory colors #01 to #03, is set to 0 or set to be smaller than those of other colors.

The pixel value conversion of the HDR image is executed using the matrix satisfying the above two conditions, and the pixel values of the HDR image are set as the pixel values of the SDR image.

Details of the above conditions 1 and 2 will be sequentially described.

First, the above (condition 1) will be described.

(Condition 1) A matrix in which the value of the input signal of the HDR image at a boundary position between the SDR region and the HDR extension region is set to "white" in which the input signal of the SDR image=1.0 (maximum value), that is, reference white.

Details of the (condition 1) will be described with reference to FIG. 13.

In the example illustrated in FIG. 13, the value of the input signal of the HDR image=0.5 at the boundary position between the SDR region and the HDR extension region. Applying the matrix of setting the value of the input signal of the HDR image=0.5 to "white" where the input signal of the SDR image=1.0 (maximum value), that is, the reference white, is the condition 1.

For example, assume that the RGB values of the SDR image are 8-bit data and pixel values (RGB) are set to a range of values (R, G. B)=(0, 0, 0) to (255, 255, 255). At this time, "white" where the input signal of the SDR image=1.0 (maximum value) has (R, G, B)=(255, 255, 255).

Meanwhile, assume that the RGB values of the HDR image are 10-bit data and pixel values (RGB) are set to a range of values (R, G. B)=(0, 0, 0) to (1023, 1023, 1023).

At this time, the input signal of the HDR image=0.5 has (R, G, B) (511, 511, 511).

In this case, the matrix M is a matrix that satisfies the following (conditional expression 1).

$$(1023,1023,1023) = M \times (511,511,511) \quad \text{(Conditional Expression 1)}$$

The matrix satisfying the above (condition expression 1) is the matrix satisfying the (condition 1), that is, the matrix of setting the value of the input signal of the HDR image at the boundary position between the SDR region and the HDR extension region to "white" where the input signal of the SDR image=1.0 (maximum value), that is, the reference white.

Note that, in a case where the pixel values of the HDR image are in the HDR extension region illustrated in FIG. 13, the pixel values set to the SDR image after conversion processing are all set to the maximum value, that is, "white".

In the example illustrated in FIG. 13, the HDR signals (0.5 to 1.0), which is equal to or larger than the HDR signal=0.5 at the boundary position between the SDR region and the HDR extension region, are all set to the maximum value (1: white) as the pixel values of the SDR image after conversion.

For example, in a case where the RGB value of the SDR image is 8-bit data and the RGB value of the HDR image is 10-bit data, pixels of the pixel values (RGB) of the HDR image within the range of (R, G. B)=(0, 0, 0) to (1023, 1023, 1023) are set to the maximum pixel values (RGB)=(255, 255, 255) of the SDR image after conversion.

Next, the (condition 2) will be described.

(Condition 2) A matrix in which a change rate by the matrix conversion, of specific colors of the SDR image, for example, at least a part of memory colors #01 to #06 of Macbeth color chart, for example, the memory colors #01 to #03, is set to 0 or set to be smaller than those of other colors.

This (condition 2) will be described with reference to FIGS. 14 and 15.

Figure 14:
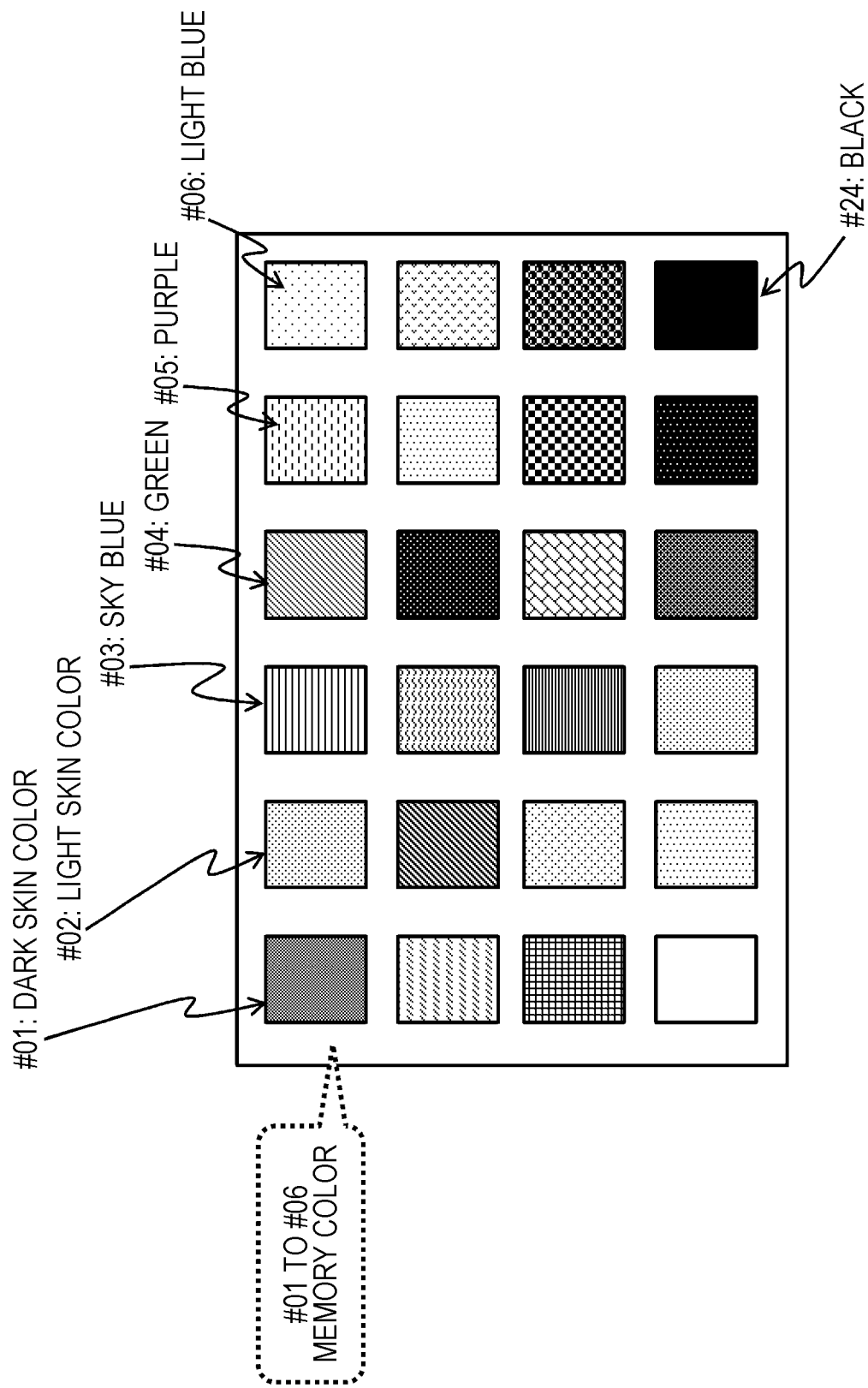
FIG. 14 is a diagram for describing a Macbeth color chart.

FIG. 14 is a diagram illustrating the Macbeth color chart.

"Macbeth color chart" is available as evaluation data of color reproducibility used in the field of color imaging including digital cameras.

Dominance factors of the color reproducibility include spectral sensitivity, tone reproduction, and three primary colors. Further, in evaluation of color reproducibility, a method of evaluating a finally obtained reproduction color without individually evaluating these factors is often used.

A typical example of a color chart applied to the evaluation of color reproducibility is the Macbeth color chart illustrated in FIG. 14.

As illustrated in FIG. 14, the Macbeth color chart is a color chart in which twenty four colors including the following colors are set as representative colors. Each color is associated with color numbers #01 to #24, and is set as follows.

| | |
|---|---|
| #01: | Dark skin color |
| #02: | Light skin color |
| #03: | Sky blue |
| #04: | Green |
| #05: | Purple |
| #06: | Light blue |
| . | . |
| . | . |
| . | . |
| #24: | Black |

The color numbers #01 to #06, of the twenty four colors, correspond to so-called memory colors. The memory color is a color unconsciously memorized as a color of a natural world such as a person, the sky, or a tree on the basis of person's daily observation.

When viewing a photograph or a color image displayed on a display, a person performs processing of comparing the color with a color memorized in the brain. The color to be compared is the memory color, that is, the colors of #01 to #06 of the Macbeth color chart, for example.

If the memory color (color numbers #01 to #06) included in the photograph or the color image displayed on the display does not match the color memorized by the image observer, the image observer feels uncomfortable with the output image. On the other hand, if the memory color (color numbers #01 to #06) in the displayed colors matches the color memorized by the observer, the observer can feel that natural colors are reproduced without feeling uncomfortable with the output image.

The (condition 2) is to obtain a matrix that can set the pixel value of the SDR image generated by the matrix conversion of the pixel values of the HDR image to match the pixel values of the memory colors of the original SDR image, or to a change rate smaller than those of other colors in the color chart, for at least a part of the memory colors #01 to #06 of the Macbeth color chart, for example, the memory colors of #01 to #03.

Figure 15:
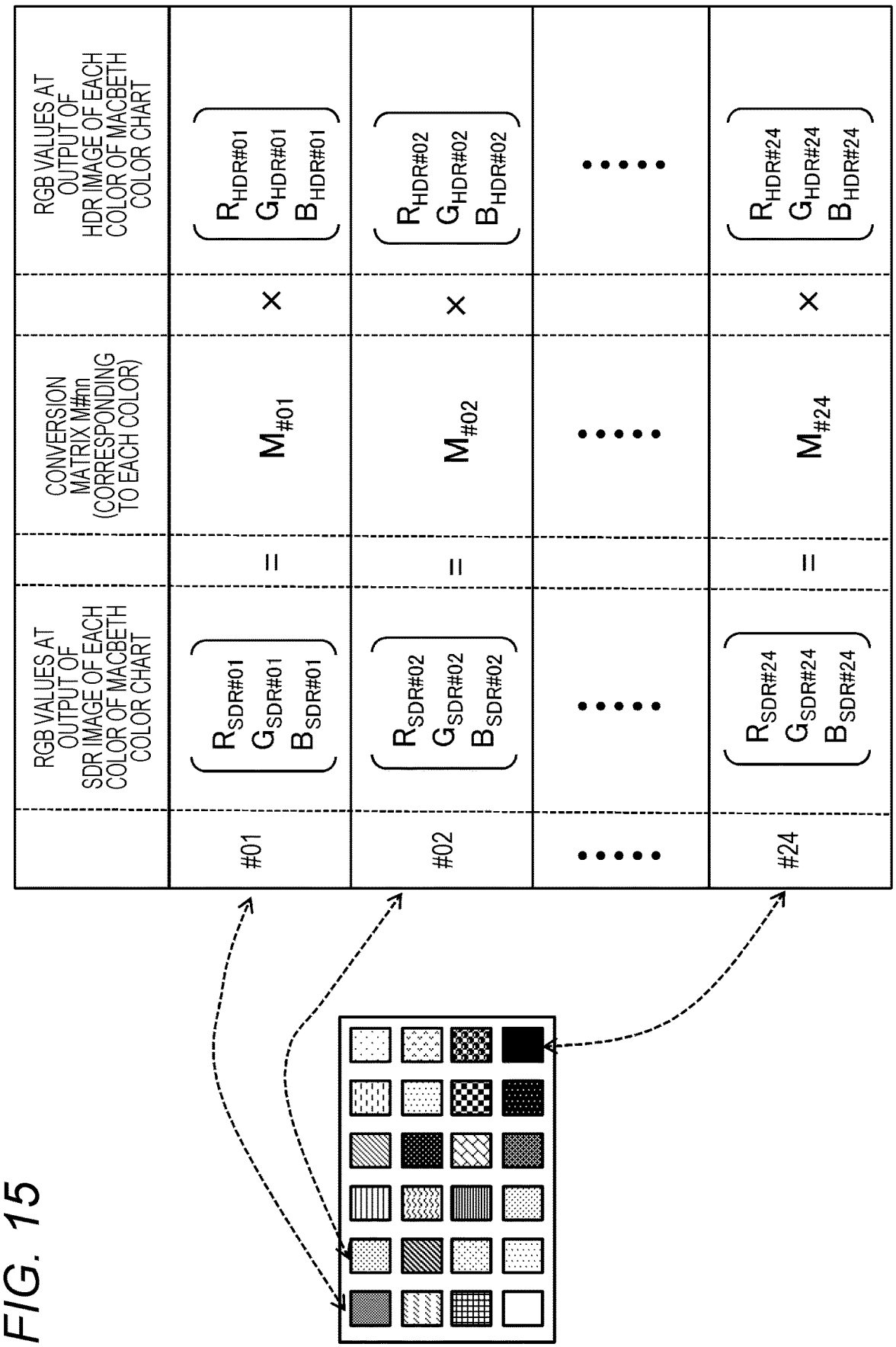
FIG. 15 is a diagram for describing matrix conversion processing for each color of the Macbeth color chart.

FIG. 15 illustrates individual matrices ($M_{\#01}$ to $M_{\#24}$), the pixel values of the SDR image ($R_{SDR\#nn}$, $G_{SDR\#nn}$, $B_{SDR\#nn}$), and the pixel values ($R_{HDR\#nn}$, $G_{HDR\#nn}$, $B_{HDR\#nn}$) of the HDR image, and two types of those data examples regarding twenty four colors (#01 to #24) included in the Macbeth color chart.

For example, when each of RGB of the SDR image is set to 8-bit data, the pixel values RGB of the SDR image are RGB=(0, 0, 0) to (255, 255, 255).

Meanwhile, when each of RGB of the HDR image is set to 10-bit data, the pixel values RGB of the SDR image are RGB=(0, 0, 0) to (1023, 1023, 1023).

Each of the matrices ($M_{\#01}$ to $M_{\#24}$) is a matrix satisfying the following expression,
regarding the twenty four colors (#01 to #24) included in the Macbeth color chart.

$$(R_{SDR\#nn}, G_{SDR\#nn}, B_{SDR\#nn}) = M_{\#nn} \times (R_{HDR\#nn}, G_{HDR\#nn}, B_{HDR\#nn})$$

In this setting, the matrices ($M_{\#01}$ to $M_{\#24}$) of the twenty four colors (#01 to #24) are all different matrices.

The expression of calculating the pixel values of the SDR image from the pixel values of the HDR image using the twenty four matrices ($M_{\#01}$ to $M_{\#24}$) corresponding to the twenty four colors (#01 to #24) of the Macbeth color chart is expressed by the following (expression 1).

[Expression 1]

$$\begin{pmatrix} R_{SDR\#01} \\ G_{SDR\#01} \\ B_{SDR\#01} \end{pmatrix} = M_{\#01} \times \begin{pmatrix} R_{HDR\#01} \\ G_{HDR\#01} \\ B_{HDR\#01} \end{pmatrix} \quad \text{Expression 1}$$

$$\begin{pmatrix} R_{SDR\#02} \\ G_{SDR\#02} \\ B_{SDR\#02} \end{pmatrix} = M_{\#02} \times \begin{pmatrix} R_{HDR\#02} \\ G_{HDR\#02} \\ B_{HDR\#02} \end{pmatrix}$$

$$\vdots$$

$$\begin{pmatrix} R_{SDR\#24} \\ G_{SDR\#24} \\ B_{SDR\#24} \end{pmatrix} = M_{\#24} \times \begin{pmatrix} R_{HDR\#24} \\ G_{HDR\#24} \\ B_{HDR\#24} \end{pmatrix}$$

In the configuration of the present disclosure, in calculating the pixel values of the SDR image from the pixel values of the HDR image, the individual matrices according to the pixel values are not applied, and the pixel values of the SDR image are calculated from the pixel values of the SDR region of the HDR image illustrated in FIG. 13, using one matrix.

Figure 16:
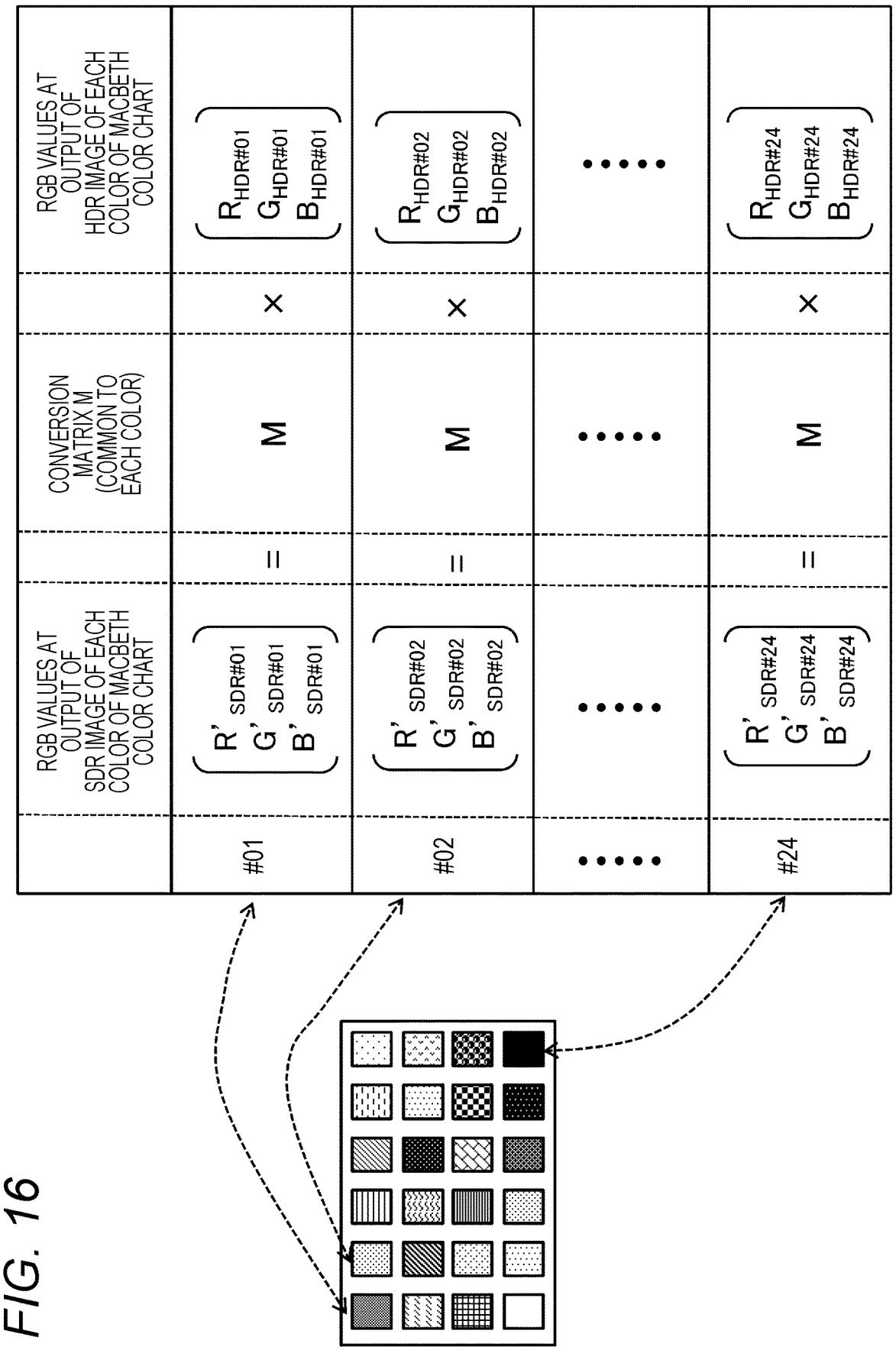
FIG. 16 is a diagram for describing the matrix conversion processing for each color of the Macbeth color chart.

The correspondence among the SDR pixel values and the HDR pixel values of each color in the Macbeth color chart and a matrix M is illustrated in FIG. 16.

The matrix M illustrated in FIG. 16 is one matrix.

The expression of calculating the pixel values of the SDR image from the pixel values of the HDR images using one matrix (M) common to the twenty four colors (#01 to #24) of the Macbeth color chart is expressed by the following (expression 2).

[Expression 2]

$$\begin{pmatrix} R'_{SDR\#01} \\ G'_{SDR\#01} \\ B'_{SDR\#01} \end{pmatrix} = M \times \begin{pmatrix} R_{HDR\#01} \\ G_{HDR\#01} \\ B_{HDR\#01} \end{pmatrix} \quad \text{Expression 2}$$

$$\begin{pmatrix} R'_{SDR\#02} \\ G'_{SDR\#02} \\ B'_{SDR\#02} \end{pmatrix} = M \times \begin{pmatrix} R_{HDR\#02} \\ G_{HDR\#02} \\ B_{HDR\#02} \end{pmatrix}$$

$$\vdots$$

$$\begin{pmatrix} R'_{SDR\#24} \\ G'_{SDR\#24} \\ B'_{SDR\#24} \end{pmatrix} = M \times \begin{pmatrix} R_{HDR\#24} \\ G_{HDR\#24} \\ B_{HDR\#24} \end{pmatrix}$$

As described above, the image processing apparatus of the present disclosure converts the pixel values of the HDR image into the pixel values of the SDR image, applying one common matrix to all the twenty four colors of the Macbeth color chart.

However, when the pixel value conversion using one matrix M is performed, the pixel values corresponding to each color (#01 to #24) of the SDR image obtained by converting the RGB values corresponding to the colors (#01 to #24) of the HDR image deviate from the RGB pixel values of the SDR image exhibiting the original Macbeth colors.

($R'_{SDR\#nn}$, $G'_{SDR\#nn}$, $B'_{SDR\#nn}$) expressed and illustrated in the above (expression 2) and FIG. 16 indicates that the colors have different values from the RGB pixel values ($R_{SDR\#nn}$, $G_{SDR\#nn}$, $B_{SDR\#nn}$) of the SDR image, which exhibit the original Macbeth colors expressed and illustrated in the (expression 1) and FIG. 15.

Note that the matrix M expressed and illustrated in the above (expression 2) and FIG. 16, that is, the common matrix M to be applied to the pixel value calculation processing from the HDR image into the SDR image is calculated to satisfy the above-described two conditions. That is, the following two conditions are satisfied.

(Condition 1) A matrix in which the value of the input signal of the HDR image at a boundary position between the SDR region and the HDR extension region is set to "white" in which the input signal of the SDR image=1.0 (maximum value), that is, reference white.

(Condition 2) A matrix in which a change rate by the matrix conversion, of specific colors of the SDR image, for example, at least a part of memory colors #01 to #06 of the Macbeth color chart, for example, the memory colors #01 to #03, is set to 0 or set to be smaller than those of other colors.

A matrix calculation sequence that satisfies these two conditions will be described with reference to the flowchart illustrated in FIG. 17.

(Step S101)

First, in step S101, the RGB values corresponding to the HDR image and the RGB values corresponding to the SDR image, of each color of the Macbeth color chart, are calculated.

That is, the following values are calculated.

Twenty four-color HDR image RGB values ($RGB_{HDR\#01}$ to $RGB_{HDR\#24}$)

Twenty four-color SDR image RGB values ($RGB_{SDR\#01}$ to $RGB_{SDR\#24}$)

These values correspond to the twenty four-color RGB values in the table illustrated in FIG. 15.

(Step S102)

Next, in step S102, all the RGB values corresponding to the HDR image and the RGB values corresponding to the SDR image, of each color of the Macbeth color chart, are converted into L*a*b* values of a CIELab color space.

That is, the following values are calculated.

Twenty four-color HDR image L*a*b* values ($L*a*b*_{HDR\#01}$ to $L*a*b*_{HDR\#24}$)

Twenty four-color SDR image L*a*b* values ($L*a*b*_{SDR\#01}$ to $L*a*b*_{SDR\#24}$)

This is performed as processing of converting the RGB values that are color expression data depending on characteristics of an output device such as a monitor into L*a*b* values as color representation data accurately reflecting human visual characteristics.

(Step S103)

Next, in step S103, an Euclidean distance corresponding to a difference between the L*a*b* value corresponding to the HDR image and the L*a*b* value corresponding to the SDR image, of each color of the Macbeth color chart, is calculated.

The following Euclidean distances are calculated.

Euclidean distances ($\Delta E^*_{ab\#01}$ to $\Delta E^*_{ab\#24}$) of each color #01 to #24 of the Macbeth color chart The Euclidean distance $\Delta E^*_{ab\#nn}$ is calculated by the following (expression 3).

[Expression 3]

$$\Delta E^* ab_{\#nn} = \sqrt{(L^*_{SDR\#nn} - L^*_{HDR\#nn})^2 + (a^*_{SDR\#nn} - a^*_{HDR\#nn})^2 + (b^*_{SDR\#nn} - b^*_{HDR\#nn})^2}$$

Expression 3

$\Delta E^*_{ab\#nn}$ is an Euclidean distance corresponding to the difference between the L*a*b* pixel values corresponding to the HDR image generated on the basis of the pixel values $RGB_{HDR\#nn}$ corresponding to the HDR image of the Macbeth color #nn illustrated in FIG. 16, and the L*a*b* pixel values corresponding to the SDR image generated on the basis of the pixel values $R'G'B'_{SDR\#nn}$ corresponding to the SDR image of the Macbeth color #nn illustrated in FIG. 16.

Note that the L*a*b* pixel values ($L^*_{SDR}$, $a^*_{SDR}$, $b^*_{SDR}$) corresponding to the SDR image can be expressed by an arithmetic expression of the L*a*b* pixel values ($L^*_{HDR}$, $a^*_{HDR}$, $b^*_{HDR}$) corresponding to the HDR image and the matrix M.

That is, the following relational expression is satisfied:

$$(L^*_{SDR}, a^*_{SDR}, b^*_{SDR}) = M \times (L^*_{HDR}, a^*_{HDR}, b^*_{HDR}).$$

Therefore, the above (expression 3) is expressed by the arithmetic expression of the L*a*b* pixel value ($L^*_{HDR}$, $a^*_{HDR}$, $b^*_{HDR}$) corresponding to the HDR image and the matrix M.

(Step S104)

Next, in step S104, one conversion matrix M having a minimum sum total of the Euclidean distances is calculated.

That is, one conversion matrix M having a minimum value of the following (expression 4) is calculated.

[Expression 4]

$$\sum_{nn=01}^{24} k_{nn} \Delta E^* ab_{\#nn}$$

Expression 4

Note that, in the above (expression 4),

Knn is a weighting coefficient corresponding to each color (#nn=#01 to #24).

In this way, the matrix M is calculated applying a least squares method to obtain $\Sigma Knn \cdot \Delta E^*_{ab\#nn} \rightarrow$ the minimum value.

Note that, in this example, the matrix M is calculated applying all the Euclidean distances of the constituent colors #01 to #24 of the matrix color chart. However, for example, the processing may be performed excluding the high luminance color such as white included in the Macbeth color chart, that is, the high luminance color that is not converted by the matrix conversion, from target of the processing of calculating the above Euclidean distances and the processing of calculating the matrix.

The matrix M calculation processing is executed on condition that the following conditions are satisfied.

Condition 1: White is the reference color.

Condition 2: The change rate of at least a part of the memory colors (#01 to #06), for example, the three types of colors #01 to #03, of the twenty four colors of the Macbeth color chart, is set to 0 or to be smallest.

As processing to satisfy the above condition 2, processing of setting large values to the weighting coefficients Knn corresponding to the memory colors (#01 to #03) is performed in the above (expression 4), for example. Specifically, for example, the weighting coefficients Knn corresponding to the memory colors (#01 to #03) are set to large coefficients such as three times the weighting coefficient of the other colors (#04 or more).

Note that, here, as the condition 2, the setting of causing the change rate of the three types of colors #01 to #03 of the Macbeth color chart to be 0 or to be smallest has been adopted. However, various settings such as setting the change rate of the six types of colors #01 to #06 of the Macbeth color chart to 0 or to be smallest, and setting the change rate of four types of colors #01 to #04 of the Macbeth color chart to 0 or to be smallest, for example, are available.

Note that the matrix is calculated giving priority to making the change rate of the color included in the category of the memory color smaller than the change rate of the category of other than the memory color.

For this priority processing, the least squares method of setting the weighting coefficient Knn corresponding to the selected memory color to a large coefficient such as three times the coefficient of other colors and reducing the sum total of the Euclidean distances is executed and the matrix calculation processing is performed.

That is, the matrix M is calculated applying the least squares method to make the calculated value of the above (expression 4) minimum.

Figure 17:
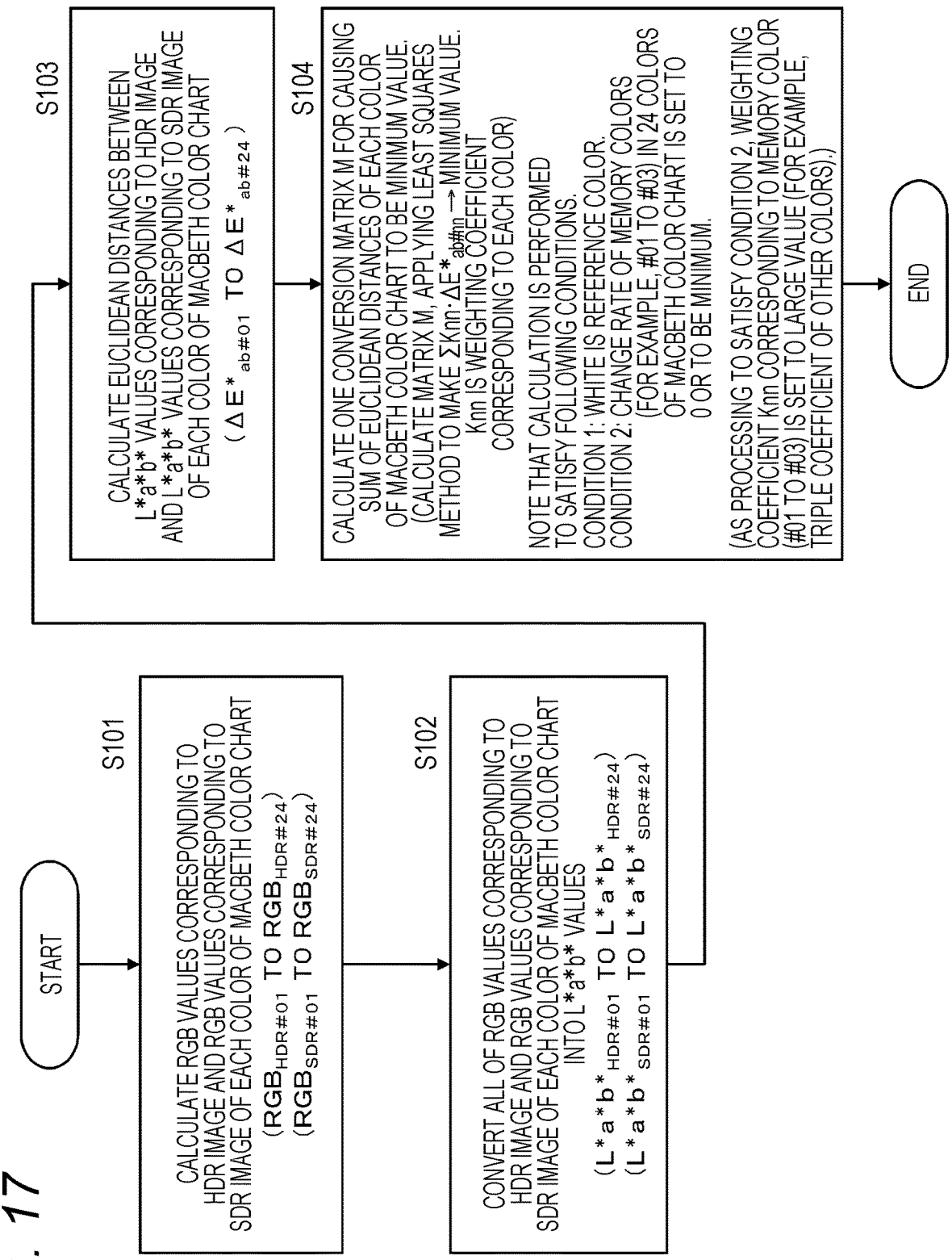
FIG. 17 is a flowchart for describing a sequence of image conversion processing to which matrix conversion performed by the image processing apparatus of the present disclosure is applied.

One matrix M calculated according to the flow illustrated in FIG. 17 is the one matrix for converting the HDR image pixel values into the SDR image pixel values.

Note that, as described above, the pixel values to which the matrix is applied are not all the pixel values of the HDR image, and are only the HDR pixel values in the SDR region illustrated in FIG. 13.

All the SDR pixel values after conversion in the HDR extension region are output as the maximum value, that is, "white".

A configuration and a processing example of an image processing apparatus that calculates the pixel values of the SDR image from the pixel values of the HDR image, applying such one matrix and executes display unit output will be described with reference to FIG. 18.

Figure 18:
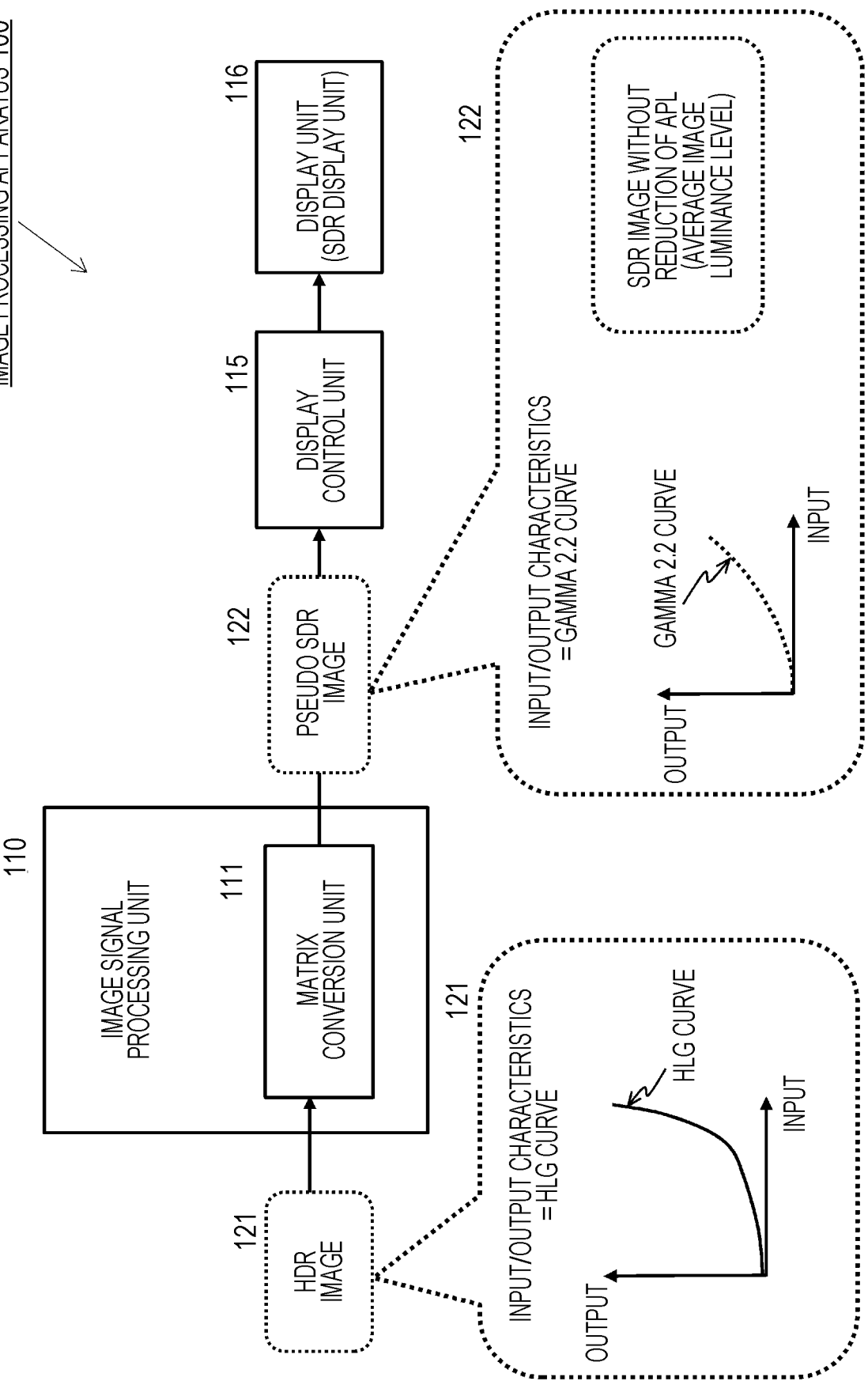
FIG. 18 is a diagram for describing image conversion processing to which matrix conversion performed by the image processing apparatus of the present disclosure is applied.

An image processing apparatus 100 illustrated in FIG. 18 includes an image signal processing unit 110, a display control unit 115, and a display unit 116, similarly to the image processing apparatus 100 illustrated in FIG. 9 described above.

An image processing apparatus 100 in FIG. 18 is a user apparatus (client) including a display unit such as a television, a smartphone, or a PC, for example.

The image processing apparatus 100 displays received image data from a broadcast station, a streaming server, or the like, or reproduced image data from a medium such as a Blu-ray (registered trademark) disc (BD) on a display unit 116, for example.

The image signal processing unit 110 inputs an HDR image 121 from a broadcast station, a server, or a medium such as a Blu-ray (registered trademark) disc (BD), for example.

The image signal processing unit 110 includes a matrix conversion unit 111, and the matrix conversion unit 111 converts the pixel values of the HDR image into the pixel values of the SDR image.

The matrix applied in the matrix conversion unit 111 is the matrix generated according to the sequence described with reference to the flowchart in FIG. 17.

This matrix is stored in a storage unit of the image processing apparatus 100 in advance although not illustrated in FIG. 18.

The matrix applied in the matrix conversion unit 111 is one matrix, and the pixel values of the SDR region above described with reference to FIG. 13, of the constituent pixels of the HDR image, are selected and converted into the pixel values of the SDR image by the arithmetic processing with the matrix.

Specifically, for example, pixel values ($R_{SDR}$, $G_{SDR}$, $B_{SDR}$) of the SDR image are calculated by the following calculation expression.

$$(R_{SDR}, G_{SDR}, B_{SDR}) = M \times (R_{HDR}, G_{HDR}, B_{HDR})$$

In the above expression,

M is the matrix calculated according to the flow illustrated in FIG. 17, ($R_{HDR}$, $G_{HDR}$, $B_{HDR}$) are the RGB pixel values of the HDR image, and ($R_{HDR}$, $G_{HDR}$, $B_{HDR}$) are the pixel values of the SDR image to be calculated.

Note that the pixel values to be calculated for the SDR pixel values by the above matrix are only the low luminance region pixels, that is, the pixels in the SDR region illustrated in FIG. 13, of the constituent pixels of the original HDR image.

All the high luminance HDR pixels included in the HDR extension region illustrated in FIG. 13 are set to the highest luminance "white" and output in the SDR image.

The matrix conversion unit 111 of the image signal processing unit 110 generates the pseudo SDR image 122 by the above-described processing and outputs the pseudo SDR image 122 to the display control unit 115.

The display control unit 115 generates an output signal to the display unit 116 on the basis of the input signal from the matrix conversion unit 111 of the image signal processing unit 110.

The display unit 116 drives a display panel, using the input signal from the display control unit 115, and executes image display.

As described above, the matrix conversion unit 111 of the image signal processing unit 110 of the image processing apparatus 100 illustrated in FIG. 18 executes the processing of converting the pixel values of the HDR image 121, applying one conversion matrix to the low luminance region pixels (the pixels in the SDR region in FIG. 13) where the luminance is a prescribed threshold or less, of the constituent pixels of the HDR image 121, into the pixel values of the SDR image.

The prescribed threshold is an output value corresponding to the input value=0.5 that is an intermediate value among the input values 0 to 1 with respect to the display unit of the HDR image, for example.

Note that the matrix conversion unit 111 of the image signal processing unit 110 sets the high luminance region pixels (the pixels in the HDR extension region in FIG. 13) having the luminance higher than the prescribed threshold, of the constituent pixels of the HDR image 121 to be converted, to the highest output pixels (white) of the SDR image after conversion.

The HDR image 121 to be input to the matrix conversion unit 111 is the HDR image having the input/output characteristics according to the hybrid log-gamma (HLG) curve, as illustrated in FIG. 18.

Meanwhile, the input/output characteristics of the pseudo SDR image 122 generated in the matrix conversion unit 111 are the characteristics according to 2.2 gamma curve as illustrated in FIG. 18. Further, the pseudo SDR image 122 becomes the bright SDR image in which the APL that is the average luminance of the image in whole is not reduced.

This is the effect based on the processing of setting the pixel values to be converted by the matrix conversion to the pixels in the SDR region, that is, the pixels in the low luminance region of the HDR image, and setting the pixel values of the HDR image at the boundary position between the SDR image and the HDR extension region that is the high luminance pixel region to the highest pixel values (white) of the SDR image after conversion, as described with reference to FIG. 13.

Note that the pixels in the HDR extension region in the HDR image are all set to the highest luminance (white) in the SDR image after conversion.

Note that, in the configuration illustrated in FIG. 18, the matrix conversion unit 111 can perform the matrix conversion using the matrix stored in a storage unit (not illustrated) in advance, that is, the matrix calculated according to the flowchart illustrated in FIG. 17.

Figure 19:
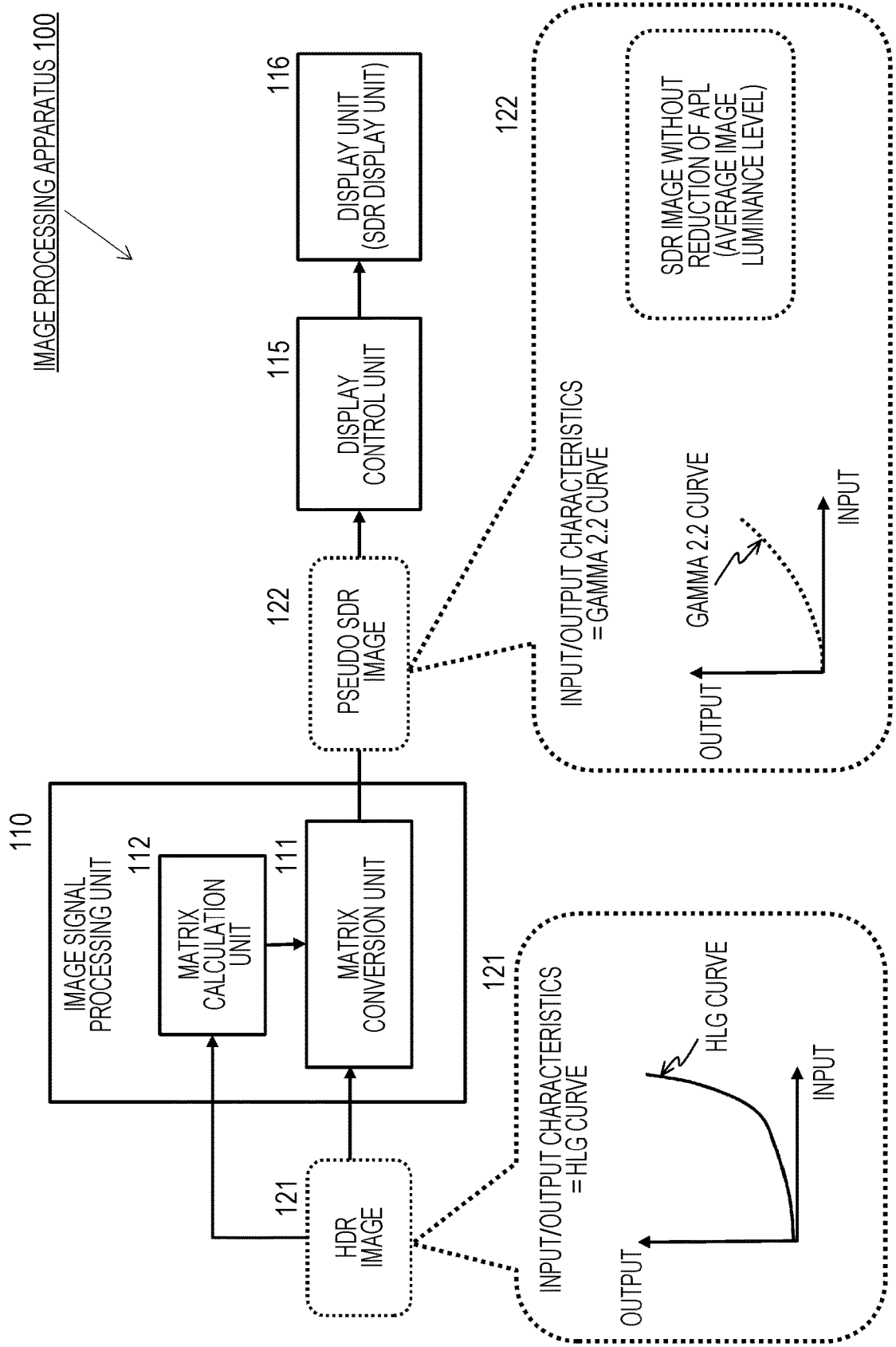
FIG. 19 is a diagram for describing image conversion processing to which matrix conversion performed by the image processing apparatus of the present disclosure is applied.

Alternatively, as illustrated in FIG. 19, a matrix calculation unit 112 may be provided in the image signal processing unit 110, and the matrix calculation unit 112 may execute the matrix calculation processing according to the sequence in FIG. 17.

That is, the matrix calculation unit 112 calculates one common conversion matrix for converting a plurality of different pixel values of the HDR image into the pixel values of the SDR image. This conversion matrix is a matrix to be applied only to the conversion of the pixel values that are the prescribed threshold or less, of the constituent pixels of the HDR image, and the conversion matrix having the setting of making the difference in color between the HDR image and the SDR image corresponding to the plurality of setting colors of the Macbeth color chart small is calculated.

The matrix calculation unit 112 calculates the conversion matrix for causing the pixel values of the SDR image after conversion calculated by application of the conversion matrix to match the pixel values of the SDR image corresponding to a prescribed specific color, or to have a smaller change rate than a change rate of the pixel values of a color other than the specific color.

In the configuration illustrated in FIG. 19, the matrix conversion unit 111 executes processing using the matrix calculated by the matrix calculation unit 112.

Note that, in the above-described embodiment, an example of setting the pixel values of the HDR image to be converted by the matrix conversion to the SDR region described with reference to FIG. 13, and setting the boundary between the SDR region and the HDR extension region to the value half of the input value (0 to 1.0) corresponding to the pixel value of the HDR image, that is, the HDR input value=0.5, has been described.

The setting of the SDR region and the HDR extension region is not limited to the example illustrated in FIG. 13, and various settings can be made.

Figure 20:
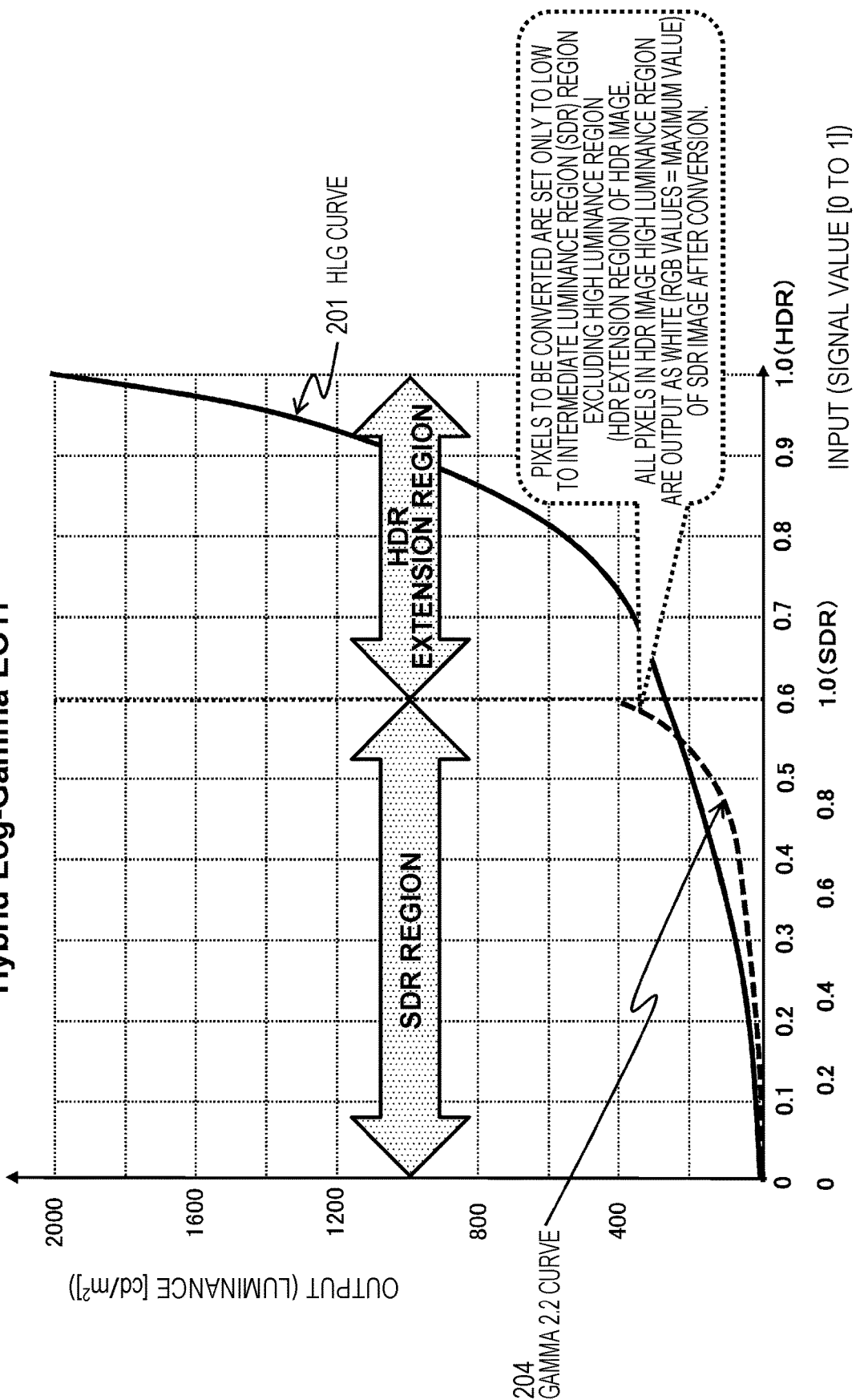
FIG. 20 is a diagram for describing processing of the matrix conversion unit executed by the image processing apparatus of the present disclosure.

FIG. 20 illustrates an example in which the boundary between the SDR region and the HDR extension region is set to the HDR input value=0.6.

In the case of setting the SDR region and the HDR extension region as illustrated in FIG. 20, the pixel values to be converted by the matrix conversion are set to fall within the range of the input values=0 to 0.6 of the HDR image, and a matrix for converting the input value=0.6 of the HDR image into the SDR input value=1.0 corresponding to the maximum pixel value of the SDR image after conversion is calculated and used.

The pixel values of the HDR image in the HDR extension region where the input value of the HDR image is 0.6 or more are not converted by the matrix conversion and are all set to the highest luminance (white) in the SDR image after conversion.

Figure 21:
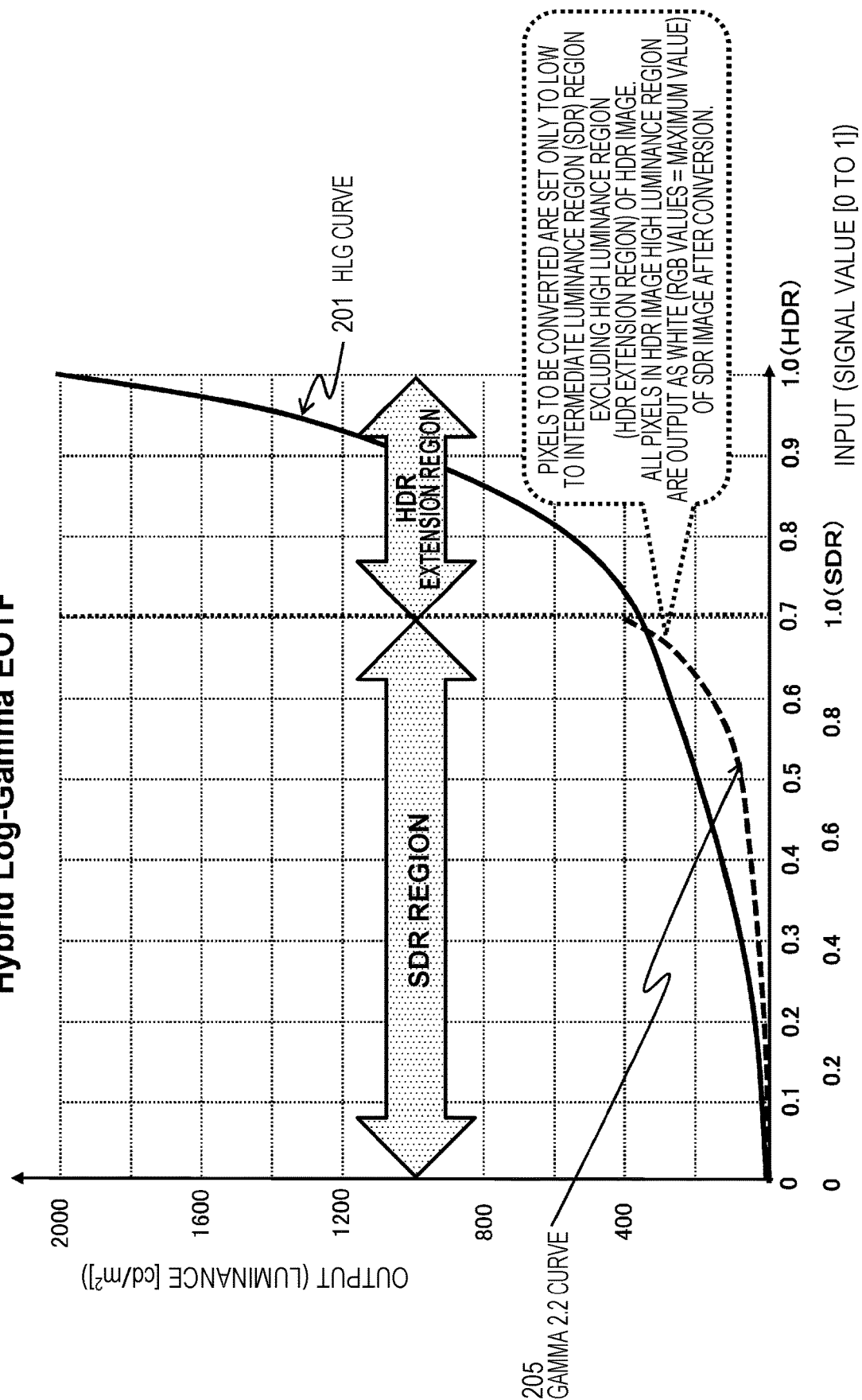
FIG. 21 is a diagram for describing processing of the matrix conversion unit executed by the image processing apparatus of the present disclosure.

FIG. 21 illustrates an example in which the boundary between the SDR region and the HDR extension region is set to the HDR input value=0.7.

In the case of setting the SDR region and the HDR extension region as illustrated in FIG. 21, the pixel values to be converted by the matrix conversion are set to fall within the range of the input values=0 to 0.7 of the HDR image, and a matrix for converting the input value=0.7 of the HDR image into the SDR input value=1.0 corresponding to the maximum pixel value of the SDR image after conversion is calculated and used.

The pixel values of the HDR image in the HDR extension region where the input value of the HDR image is 0.7 or more are not converted by the matrix conversion and are all set to the highest luminance (white) in the SDR image after conversion.

In this manner, various settings can be made for the setting of the SDR region and the HDR extension region.

The image processing apparatus of the present disclosure sets two regions of the SDR region to be converted by the matrix conversion and the HDR extension region to be set to the maximum pixel value (white: the input value=1.0) in the SDR image after conversion without being converted by the matrix conversion, and performs conversion from the HDR image into the SDR image.

By the processing, a bright converted SDR image in which the luminance level (APL) of the image in whole is not reduced can be generated.

[6. Configuration Example of Image Processing Apparatus]

Figure 22:
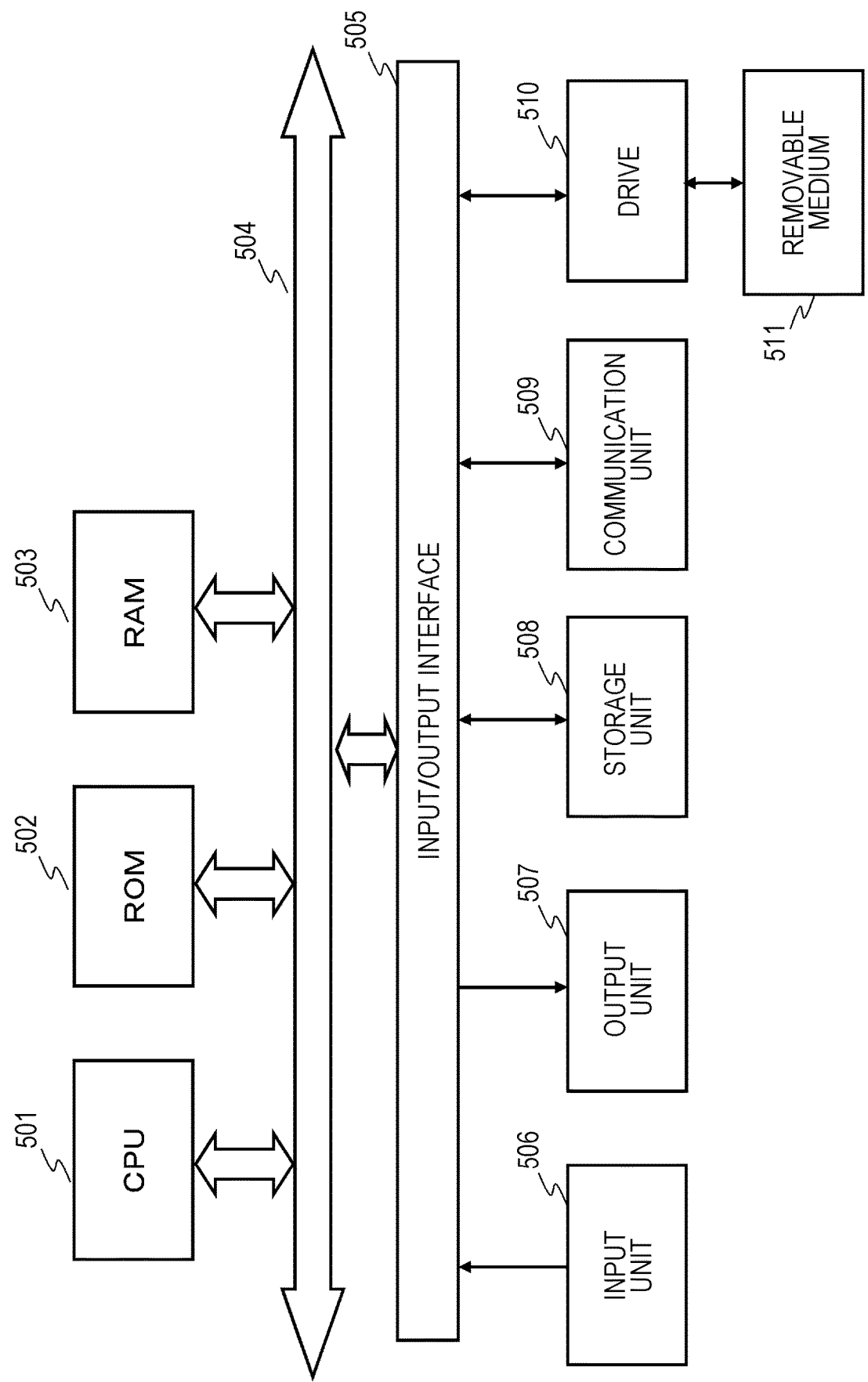
FIG. 22 is a diagram for describing a configuration example of the image processing apparatus according to the present disclosure.

Next, a hardware configuration example of the image processing apparatus of the present disclosure will be described with reference to FIG. 22.

A central processing unit (CPU) 501 functions as a data processing unit that execute various types of processing according to a program stored in a read only memory (ROM) 502 or a storage unit 508. For example, the CPU 501 executes processing according to the sequence described in the above embodiment. A random access memory (RAM) 503 stores the program executed by the CPU 501, data, and the like. These CPU 501, ROM 502, and RAM 503 are mutually connected by a bus 504.

The CPU 501 is connected to an input/output interface 505 via the bus 504, and an input unit 506 including various switches, a keyboard, a mouse, a microphone and the like, and an output unit 507 including a display, a speaker, and the like are connected to the input/output interface 505. The CPU 501 executes various types of processing corresponding to commands input from the input unit 506, and outputs processing results to the output unit 507, for example.

The storage unit 508 connected to the input/output interface 505 includes, for example, a hard disk and the like, and stores the program executed by the CPU 501 and various data. A communication unit 509 functions as a transmission/reception unit for data communication via a network such as the Internet or a local area network and also functions as a transmission/reception unit of a broadcast wave, and communicates with an external device.

A drive 510 connected to the input/output interface 505 drives a removable medium 511 such as a magnetic disk, an optical disk, a magneto-optical disk, or a semiconductor memory such as a memory card, and executes data recording or reading.

[7. Conclusion of Configurations of Present Disclosure]

The embodiments of the present disclosure have been described in detail with reference to the specific embodiments. However, it is obvious that those skilled in the art can make modifications and substitutions of the embodiments without departing from the gist of the present disclosure. That is, the present invention has been disclosed in the form of exemplification, and should not be restrictively interpreted. To judge the gist of the present disclosure, the scope of claims should be taken into consideration.

Note that the technology disclosed in the present description can have the following configurations.

(1) An image processing apparatus including:

an image signal processing unit configured to input a high dynamic range (HDR) image and convert the HDR image into an SDR image having a narrower dynamic range than the HDR image, in which the image signal processing unit executes processing of converting a pixel value of the HDR image into a pixel value of the SDR image, applying one conversion matrix to low luminance region pixels having luminance that is a prescribed threshold or less among constituent pixels of the HDR image.

(2) The image processing apparatus according to (1), in which the image signal processing unit sets a high luminance region pixel having higher luminance than the prescribed threshold as a highest output pixel of the SDR image after conversion among the constituent pixels of the HDR image to be converted.

(3) The image processing apparatus according to (1) or (2), in which the conversion matrix is a conversion matrix for setting the pixel value of the HDR image, the pixel value corresponding to the prescribed threshold, to a highest output pixel of the SDR image after conversion.

(4) The image processing apparatus according to any one of (1) to (3), in which the conversion matrix is a conversion matrix having a setting in which the pixel value of the SDR image after conversion matches a pixel value of the SDR image corresponding to a prescribed specific color, or the pixel value of the SDR image after conversion has a smaller change rate than a change rate of the pixel values of a color other than the specific color.

(5) The image processing apparatus according to (4), in which the specific color is a memory color set in a Macbeth color chart.

(6) The image processing apparatus according to (4) or (5), in which the specific color is colors of color numbers #01 to #03 among memory colors set in a Macbeth color chart.

(7) The image processing apparatus according to any one of (1) to (6), in which the prescribed threshold is an output value corresponding to an input value=0.5 that is an intermediate value among input values 0 to 1 with respect to a display unit of the HDR image.

(8) The image processing apparatus according to any one of (1) to (7), in which the HDR image is an HDR image prescribed by International Telecommunication Union-Radio Communications Sector (ITU-R), and is an HDR image in which an input/output characteristic is prescribed by a hybrid log-gamma (HLG) curve.

(9) An image processing apparatus including:
a matrix calculation unit configured to calculate a conversion matrix to be applied to image conversion processing of inputting a high dynamic range (HDR) image and converting the HDR image into an SDR image having a narrower dynamic range than the HDR image, in which
the matrix calculation unit calculates the conversion matrix that is one common conversion matrix for converting a plurality of different pixel values of the HDR image into pixel values of the SDR image, and is a conversion matrix to be applied only to conversion of a pixel value that is a prescribed threshold or less among constituent pixels of the HDR image.

(10) The image processing apparatus according to (9), in which
the matrix calculation unit calculates the conversion matrix having a setting of making a difference in color between the HDR image and the SDR image corresponding to a plurality of setting colors of a Macbeth color chart small.

(11) The image processing apparatus according to (10), in which the difference in color is a difference in an L*a*b* color space.

(12) The image processing apparatus according to any one of (9) to (11), in which
the matrix calculation unit calculates the conversion matrix for setting the pixel value of the HDR image, the pixel value corresponding to the prescribed threshold, to a highest output pixel of the SDR image after conversion.

(13) The image processing apparatus according to any one of (9) to (12), in which
the matrix calculation unit calculates the conversion matrix for causing the pixel value of the SDR image after conversion calculated by application of the conversion matrix to match a pixel value of the SDR image corresponding to a prescribed specific color, or to have a smaller change rate than a change rate of the pixel values of a color other than the specific color.

(14) The image processing apparatus according to (13), in which the specific color is a memory color set in a Macbeth color chart.

(15) The image processing apparatus according to (13) or (14), in which the specific color is colors of color numbers #01 to #03 among memory colors set in a Macbeth color chart.

(16) The image processing apparatus according to any one of (9) to (15), in which the HDR image is an HDR image prescribed by International Telecommunication Union-Radio Communications Sector (ITU-R), and is an HDR image in which an input/output characteristic is prescribed by a hybrid log-gamma (HLG) curve.

(17) An image processing method executed in an image processing apparatus,
the image processing apparatus including
an image signal processing unit configured to input a high dynamic range (HDR) image and convert the HDR image into an SDR image having a narrower dynamic range than the HDR image, in which
the image signal processing unit executes processing of converting a pixel value of the HDR image into a pixel value of the SDR image, applying one conversion matrix to low luminance region pixels having luminance that is a prescribed threshold or less among constituent pixels of the HDR image.

(18) An image processing method executed in an image processing apparatus,
the image processing apparatus including
a matrix calculation unit configured to calculate a conversion matrix to be applied to image conversion processing of inputting a high dynamic range (HDR) image and converting the HDR image into an SDR image having a narrower dynamic range than the HDR image, in which
the matrix calculation unit calculates the conversion matrix that is one common conversion matrix for converting a plurality of different pixel values of the HDR image into pixel values of the SDR image, and is a conversion matrix to be applied only to conversion of a pixel value that is a prescribed threshold or less among constituent pixels of the HDR image.

(19) A program for causing an image processing apparatus to execute image processing,
the image processing apparatus including
an image signal processing unit configured to input a high dynamic range (HDR) image and convert the HDR image into an SDR image having a narrower dynamic range than the HDR image, in which
the program causes the image signal processing unit to execute processing of converting a pixel value of the HDR image into a pixel value of the SDR image, applying one conversion matrix to low luminance region pixels having luminance that is a prescribed threshold or less among constituent pixels of the HDR image.

(20) A program for causing an image processing apparatus to execute image processing,
the image processing apparatus including
a matrix calculation unit configured to calculate a conversion matrix to be applied to image conversion processing of inputting a high dynamic range (HDR) image and converting the HDR image into an SDR image having a narrower dynamic range than the HDR image, in which
the program causes the matrix calculation unit to calculate the conversion matrix that is one common conversion matrix for converting a plurality of different pixel values of the HDR image into pixel values of the SDR image, and is a conversion matrix to be applied only to conversion of a pixel value that is a prescribed threshold or less among constituent pixels of the HDR image.

Further, the series of processing described in the description can be executed by hardware, software, or a combined configuration of the hardware and software. In the case of executing the processing by software, a program, in which the processing sequence is recorded, can be installed in a memory of a computer incorporated in dedicated hardware and executed by the computer, or the program can be installed in and executed by a general-purpose computer capable of executing various types of processing. For example, the program can be recorded in the recording medium in advance. Other than the installation from the recording medium to the computer, the program can be received via a network such as a local area network (LAN) or the Internet and installed in a recording medium such as a built-in hard disk.

Note that the various types of processing described in the description may be executed not only in chronological order as described but also in parallel or individually depending on the processing capability of the device that executes the process or as required. Further, the system in the present description is a logical aggregate configuration of a plurality of devices, and is not limited to devices having respective configurations within the same housing.

INDUSTRIAL APPLICABILITY

As described above, according to the configuration of an embodiment of the present disclosure, the apparatus and the method for generating a high quality SDR image without significant reduction in image average luminance are realized by the matrix conversion for the HDR image.

Specifically, the image signal processing unit that converts the HDR image into the SDR image converts the pixel value of the HDR image into the pixel value of the SDR image, applying one conversion matrix to the low luminance region pixels having luminance that is the prescribed threshold or less among the constituent pixels of the HDR image. The high luminance region pixel having higher luminance than the prescribed threshold is set as the highest output pixel of the SDR image after conversion. The conversion matrix to be applied is the matrix having setting in which the change rate of the memory color set in the Macbeth color chart becomes smaller.

With the configuration, the apparatus and the method for generating the high quality SDR image without significant reduction in image average luminance are realized by the matrix conversion for the HDR image.

REFERENCE SIGNS LIST

10 Image processing apparatus
11 Image signal processing unit
12 Display control unit
13 Display unit
71 Linear conversion unit
72 Color gamut luminance conversion unit
73 Linear gamma conversion unit
81 HDR image
84 Pseudo SDR image
100 Image processing apparatus
110 Image signal processing device
111 Matrix conversion unit
112 Matrix calculation unit
115 Display control unit
116 Display unit
121 HDR image
122 Pseudo SDR image
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An image processing apparatus comprising:
an image signal processing unit configured to receive a high dynamic range (HDR) image and convert the HDR image into a standard dynamic range (SDR) image having a narrower dynamic range than the HDR image, wherein
the image signal processing unit executes processing of converting a pixel value of the HDR image into a pixel value of the SDR image, applying one conversion matrix to low luminance region pixels having luminance that is a prescribed threshold or less among constituent pixels of the HDR image, and
the image signal processing unit is implemented via at least one processor.

2. The image processing apparatus according to claim 1, wherein
the image signal processing unit sets a high luminance region pixel having higher luminance than the prescribed threshold as a highest output pixel of the SDR image after conversion among the constituent pixels of the HDR image to be converted.

3. The image processing apparatus according to claim 1, wherein
the conversion matrix is a conversion matrix for setting the pixel value of the HDR image, the pixel value corresponding to the prescribed threshold, to a highest output pixel of the SDR image after conversion.

4. The image processing apparatus according to claim 1, wherein
the conversion matrix is a conversion matrix having a setting in which the pixel value of the SDR image after conversion matches a pixel value of the SDR image corresponding to a prescribed specific color, or the pixel value of the SDR image after conversion has a smaller change rate than a change rate of the pixel values of a color other than the specific color.

5. The image processing apparatus according to claim 4, wherein the specific color is a memory color set in a Macbeth color chart.

6. The image processing apparatus according to claim 4, wherein the specific color is colors of color numbers #01 to #03 among memory colors set in a Macbeth color chart.

7. The image processing apparatus according to claim 1, wherein the prescribed threshold is an output value corresponding to an input value=0.5 that is an intermediate value among input values 0 to 1 with respect to a display unit of the HDR image.

8. The image processing apparatus according to claim 1, wherein the HDR image is an HDR image prescribed by International Telecommunication Union-Radio Communications Sector (ITU-R), and is an HDR image in which an input/output characteristic is prescribed by a hybrid log-gamma (HLG) curve.

9. An image processing apparatus comprising:
a matrix calculation unit configured to calculate a conversion matrix to be applied to image conversion processing of receiving a high dynamic range (HDR) image and converting the HDR image into a standard dynamic range (SDR) image having a narrower dynamic range than the HDR image, wherein
the matrix calculation unit calculates the conversion matrix that is one common conversion matrix for converting a plurality of different pixel values of the HDR image into pixel values of the SDR image, and is a conversion matrix to be applied only to conversion of a pixel value that is a prescribed threshold or less among constituent pixels of the HDR image, and
the matric calculation unit is implemented via at least one processor.

10. The image processing apparatus according to claim 9, wherein
the matrix calculation unit calculates the conversion matrix having a setting of making a difference in color between the HDR image and the SDR image corresponding to a plurality of setting colors of a Macbeth color chart small.

11. The image processing apparatus according to claim 10, wherein the difference in color is a difference in an L*a*b* color space.

12. The image apparatus according to claim 9, wherein
the matrix calculation unit calculates the conversion matrix for setting the pixel value of the HDR image, the pixel value corresponding to the prescribed threshold, to a highest output pixel of the SDR image after conversion.

13. The image processing apparatus according to claim 9, wherein
the matrix calculation unit calculates the conversion matrix for causing the pixel value of the SDR image after conversion calculated by application of the conversion matrix to match a pixel value of the SDR image corresponding to a prescribed specific color, or to have a smaller change rate than a change rate of the pixel values of a color other than the specific color.

14. The image processing apparatus according to claim 13, wherein the specific color is a memory color set in a Macbeth color chart.

15. The image processing apparatus according to claim 13, wherein the specific color is colors of color numbers #01 to #03 among memory colors set in a Macbeth color chart.

16. The image processing apparatus according to claim 9, wherein the HDR image is an HDR image prescribed by International Telecommunication Union-Radio Communications Sector (ITU-R), and is an HDR image in which an input/output characteristic is prescribed by a hybrid log-gamma (HLG) curve.

17. An image processing method executed in an image processing apparatus,
the image processing apparatus including
an image signal processing unit configured to receive a high dynamic range (HDR) image and convert the HDR image into a standard dynamic range (SDR) image having a narrower dynamic range than the HDR image, wherein
the image signal processing unit executes processing of converting a pixel value of the HDR image into a pixel value of the SDR image, applying one conversion matrix to low luminance region pixels having luminance that is a prescribed threshold or less among constituent pixels of the HDR image, and
the image signal processing unit is implemented via at least one processor.

18. An image processing method executed in an image processing apparatus,
the image processing apparatus including
a matrix calculation unit configured to calculate a conversion matrix to be applied to image conversion processing of receiving a high dynamic range (HDR) image and converting the HDR image into a standard dynamic range (SDR) image having a narrower dynamic range than the HDR image, wherein
the matrix calculation unit calculates the conversion matrix that is one common conversion matrix for converting a plurality of different pixel values of the HDR image into pixel values of the SDR image, and is a conversion matrix to be applied only to conversion of a pixel value that is a prescribed threshold or less among constituent pixels of the HDR image, and
the matric calculation unit is implemented via at least one processor.

19. A non-transitory computer-readable medium having embodied thereon a program, which when executed by at least one processor of an image processing apparatus that is configured to receive a high dynamic range (HDR) image and convert the HDR image into a standard dynamic range (SDR) image having a narrower dynamic range than the HDR image, the program causes the image processing apparatus to execute a method, the method comprising:
converting a pixel value of the HDR image into a pixel value of the SDR image, applying one conversion matrix to low luminance region pixels having luminance that is a prescribed threshold or less among constituent pixels of the HDR image.

20. A non-transitory computer-readable medium having embodied thereon a program, which when executed by at least one processor of an image processing apparatus that is configured to calculate a conversion matrix to be applied to image conversion processing of receiving a high dynamic range (HDR) image and converting the HDR image into a standard dynamic range (SDR) image having a narrower dynamic range than the HDR image, the program causes the image processing apparatus to execute a method, the method comprising:
calculating the conversion matrix that is one common conversion matrix for converting a plurality of different pixel values of the HDR image into pixel values of the SDR image, and is a conversion matrix to be applied only to conversion of a pixel value that is a prescribed threshold or less among constituent pixels of the HDR image.

* * * * *